US012220931B2

(12) United States Patent
Darrow

(10) Patent No.: US 12,220,931 B2
(45) Date of Patent: Feb. 11, 2025

(54) AUTOMATED SYSTEM FOR FIXING SUBLIMATION TRANSFERS TO MUGS IN PREPARATION FOR SUBLIMATION PRINTING

(71) Applicant: Dartronics, Inc., Perth Amboy, NJ (US)

(72) Inventor: Kenneth A. Darrow, Perth Amboy, NJ (US)

(73) Assignee: DARTRONICS INC., Perth Amboy, NJ (US)

( * ) Notice: Subject to any disclaimer, the term of this patent is extended or adjusted under 35 U.S.C. 154(b) by 110 days.

(21) Appl. No.: 18/134,307

(22) Filed: Apr. 13, 2023

(65) Prior Publication Data

US 2023/0339247 A1 Oct. 26, 2023

Related U.S. Application Data

(60) Provisional application No. 63/332,746, filed on Apr. 20, 2022.

(51) Int. Cl.
*B41M 5/035* (2006.01)
*B41M 5/382* (2006.01)

(52) U.S. Cl.
CPC ....... *B41M 5/0358* (2013.01); *B41M 5/38221* (2013.01)

(58) Field of Classification Search
CPC ........................ B41M 5/0358; B41M 5/38221
See application file for complete search history.

(56) References Cited

U.S. PATENT DOCUMENTS

| | | | |
|---|---|---|---|
| 3,816,221 | A | 6/1974 | Shank, Jr. |
| 4,874,454 | A | 10/1989 | Talalay et al. |
| 5,019,193 | A | 5/1991 | Aramini |
| 5,170,704 | A | 12/1992 | Warren et al. |
| 5,244,529 | A | 9/1993 | Siegel |
| 5,296,081 | A | 3/1994 | Morin et al. |
| 5,382,313 | A | 1/1995 | Eminger |
| 5,395,478 | A | 3/1995 | Sattler et al. |
| 5,584,961 | A | 12/1996 | Ellsworth et al. |
| 5,630,894 | A | 5/1997 | Koch et al. |

*Primary Examiner* — Sonya M Sengupta
(74) *Attorney, Agent, or Firm* — Budzyn IP Law, LLC

(57) ABSTRACT

An automated system is provided herein for fixing sublimation transfers to mugs in preparation for sublimation printing, the system including: a conveyor; an intake for sublimation transfers; a vertically adjustable transfer platen having an upwardly facing support surface; a feeder for conveying the sublimation transfers from the intake to the support surface; a linear actuator for moving mugs from the conveyor to a target location above the support surface; first and second tape applicators; and vertically adjustable first and second wrapping arms. With a sublimation transfer resting on the support surface, and a target mug in the target location, the transfer platen is caused to press the sublimation transfer against the target mug, and the first and second wrapping arms are caused to elevate to wrap lateral portions of the sublimation transfer about the target mug, to provide a prepared mug for sublimation printing.

17 Claims, 29 Drawing Sheets

AUTOMATED SYSTEM FOR FIXING SUBLIMATION TRANSFERS TO MUGS IN PREPARATION FOR SUBLIMATION PRINTING

CROSS-REFERENCE TO RELATED APPLICATION

This application claims priority to U.S. Provisional Patent Appl. No. 63/332,746, filed Apr. 20, 2022, the contents of which are incorporated by reference herein.

FIELD OF THE INVENTION

The present invention relates generally to the field of sublimation transfers, and more particularly to automated systems for fixing sublimation transfers to mugs in preparation for sublimation printing.

BACKGROUND OF THE INVENTION

Well known techniques have been developed over the years for decorating and personalizing containers, such as ceramic cups, mugs and the like. One common technique used for this purpose is sublimation printing, wherein sublimation transfers are used which incorporate sublimable dyes in the form of a decorative design, image and/or any other desired indicia for transferring to the mug. To decorate a mug in this manner, the sublimation transfer is placed in direct contact with the mug which has been coated with a polymeric coating. With a cuff or wrap pressing the sublimation transfer against the mug, the mug is heated to a temperature at least as high as the sublimation temperature of the dyes constituting the image to be printed. This process causes vaporization of the dyes constituting the image and their immediate absorption into the polymeric coating on the mug, thereby resulting in the image being transferred from the sublimation transfer to the mug.

Sublimation printing is well known in the art and numerous processes and devices have been developed in the past for transferring images and the like to the surface of mugs and similar articles by sublimation. For example, the following U.S. Patents, which are incorporated by reference herein, describe various techniques and equipment to effect sublimation transfers and/or other similar operations.: U.S. Pat. No. 5,244,529 to Siegel; U.S. Pat. No. 5,296,081 to Morin et al.; U.S. Pat. No. 5,584,961 to Ellsworth et al.; U.S. Pat. No. 5,395,478 to Sattler et al.; U.S. Pat. No. 5,382,313 to Eminger; U.S. Pat. No. 5,019,193 to Aramini; U.S. Pat. No. 5,170,704 to Warren et al.; U.S. Pat. No. 4,874,454 to Talalay et al.; U.S. Pat. No. 3,816,221 to Shank, Jr.; and U.S. Pat. No. 5,630,894 to Koch et al.

A key element in sublimation printing is to apply the sublimation transfer smoothly onto the mug with no wrinkles or air bubbles. Equipment has been developed in the prior art to wrap a sublimation transfer about a mug and to tape the sublimation transfer in place using heat resistant tape. The sublimation transfer is held in tension about the mug to minimize wrinkling or gapping. For example, the Assignee herein developed a system where an operator manually loads a sublimation transfer and a mug into the system, on an individual basis, with the system wrapping the sublimation transfer about the mug and taping the wrapped sublimation transfer in place on the mug.

SUMMARY OF THE INVENTION

An automated system is provided herein for fixing sublimation transfers to mugs in preparation for sublimation printing, the system including: a conveyor for transporting the mugs; an intake for intaking a supply of sublimation transfers; a vertically adjustable transfer platen having an upwardly facing support surface; a feeder for conveying, on an individual basis, the sublimation transfers from the intake to rest on the support surface; a linear actuator for moving mugs, on an individual basis, from the conveyor to a target location above the support surface; first and second tape applicators located along opposing sides of the transfer platen, the first and second tape applicators being each configured to apply a fixed length of heat resistant tape to a sublimation transfer resting on the support surface; and vertically adjustable first and second wrapping arms located along opposing sides of the transfer platen, each of the first and second wrapping arms having an inwardly directed engagement surface. With a sublimation transfer resting on the support surface, and a target mug in the target location, the transfer platen is caused to elevate to press a central portion of the sublimation transfer against the target mug, and the first and second wrapping arms are caused to elevate with the engagement surfaces thereof pressing against at least portions of lateral portions of the sublimation transfer, located on opposing sides of the central portion, to wrap the lateral portions of the sublimation transfer about the target mug and to press the heat resistant tape into adherence with the target mug to provide a prepared mug for sublimation printing. Advantageously, the subject invention provides an automated system for preparing mugs for sublimation printing without operator intervention.

These and other features of the subject invention will be better understood through a study of the following detailed description and accompanying drawings.

DETAILED DESCRIPTION

Figure 1:
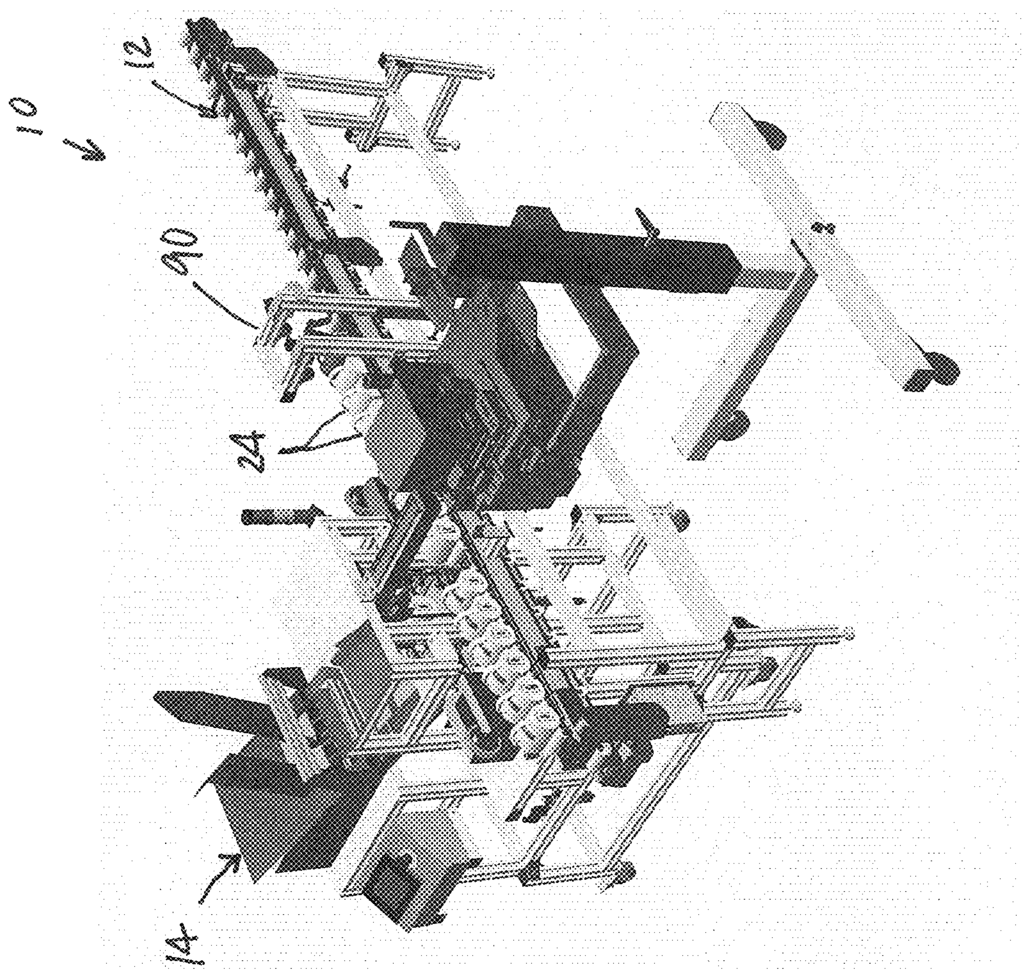
FIGS. 1-29 show the subject invention and different features thereof.
Figure 2:
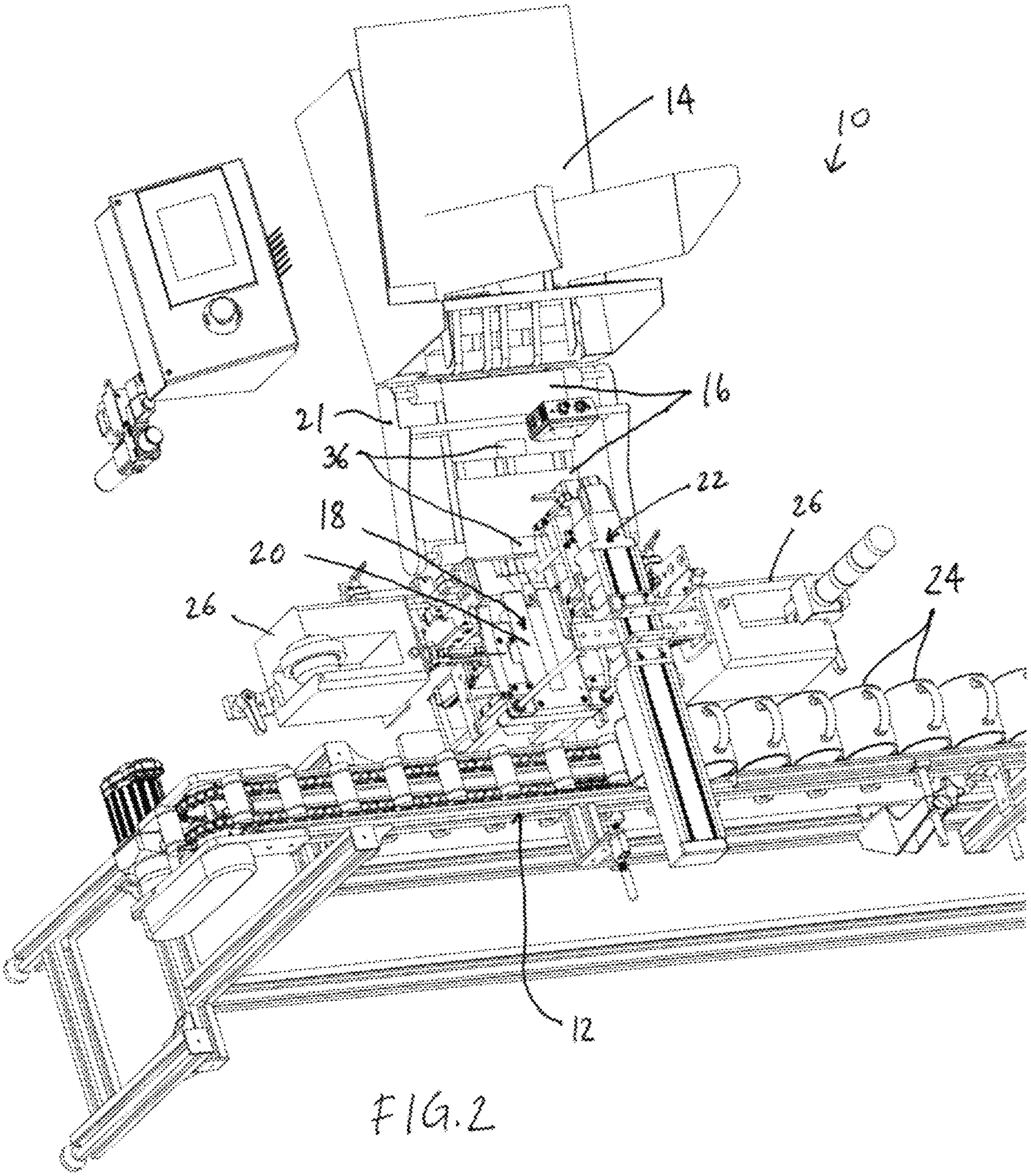
Figure 3:
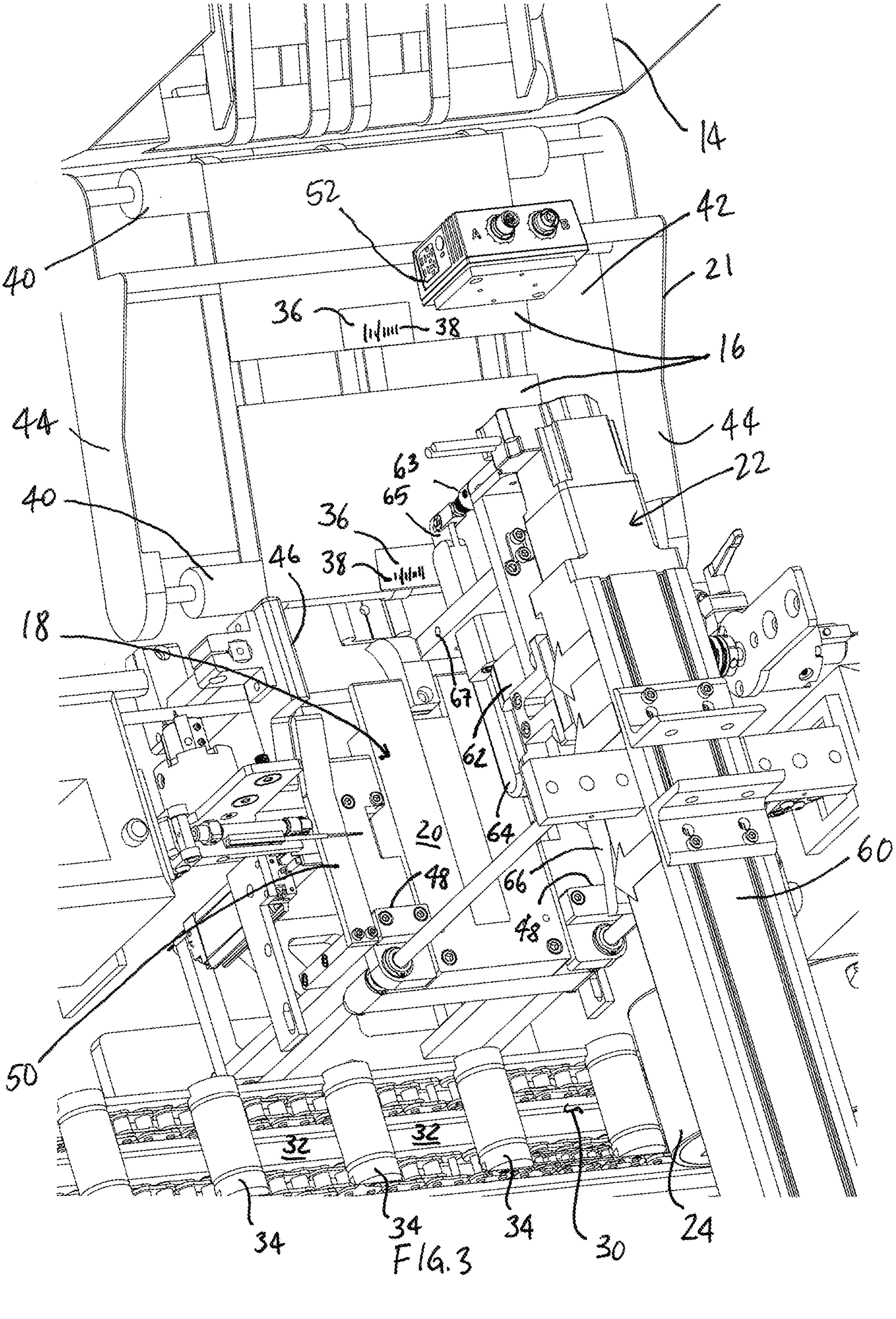

With reference to the Figures, a system 10 is provided for fixing sublimation transfers to mugs in preparation for sublimation printing. The system 10 generally includes: a conveyor 12; an intake 14 for intaking a supply of sublimation transfers 16; a vertically adjustable transfer platen 18 having an upwardly facing support surface 20; a feeder 21 for conveying, on an individual basis, the sublimation transfers 16 from the intake 14 to rest on the support surface 20; a linear actuator 22 for moving the mugs 24, on an individual basis, from the conveyor 12 to a target location above the support surface 20; first and second tape applicators 26 located along opposing sides of the transfer platen 18; and, vertically adjustable first and second wrapping arms 28 located along opposing sides of the transfer platen 18. The system 10 advantageously is an automated system for preparing mugs for sublimation printing without operator intervention.

The conveyor 12 may be of any known type usable to transport the mugs 24 to and from a loading position 30 aligned with the transfer platen 18. Preferably, the conveyor 12 is configured to advance in fixed increments. This allows for a mug 24 located at the loading position 30 to be moved from the conveyor 12, to a location above the support surface 20 for wrapping, as described below. The conveyor 12 is preferably formed with recesses or wells 32, each formed to receive one of the mugs 24. In particular, the recesses 32 are formed to accept and maintain the mugs 24 lying on their respective sides with the open ends of the mugs 24 all facing in the direction of the transfer platen 18. The recesses 32 are provided with sufficient depth to provide axial stability to the mugs 24 whilst being transported along the conveyor 12. By way of non-limiting example, spaced-apart cylindrical spacers 34 may be provided along the length of the conveyor 12. The width of the recesses 32 defined between adjacent pairs of the spacers 34 is set to the diameter of the mugs 24 to inhibit rolling of the mugs 24. The spacers 34 are preferably arranged in a cross direction relative to the direction of travel of the conveyor 12 and are all preferably parallel.

The intake 14 is configured to intake a supply of the sublimation transfers 16, e.g., in a stacked arrangement. The sublimation transfers 16 are pre-printed with customized designs, e.g., photographic images, graphics, wording, and so forth, use sublimable inks or dyes as known in the art. Preferably, upon printing, the sublimation transfers 16 is each marked with a label 36 bearing computer readable indicia 38, such as a bar code, QR code, and the like, which contains data associated with the customized design of the corresponding sublimation transfer 36 (e.g., order number, customer name, etc.). In this manner, the sublimation transfers 16 are trackable to placed orders. The intake 14 may be configured as a hopper or frame formed to accept a stack of the sublimation transfers 16.

The feeder 21 is configured to convey, on an individual basis, the sublimation transfers 16 from the intake 14 to the transfer platen 18. In particular, the feeder 21 is configured to deliver the sublimation transfers 16 to rest upon the support surface 20. The feeder 21 may utilize various forms of conveyance, including belts, friction rollers, pushers, vacuum feeds, and so forth. The feeder 21 may accommodate a series of the sublimation transfers 16 arranged therealong, with the sublimation transfers 16 being advanced in increments along the feeder 21 to the support surface 20.

The feeder 21 may be provided with one or more rollers 40 or other mechanisms for removing the sublimation transfers 16 from the intake 14 individually, particularly with the sublimation transfer 16 being stacked, and conveying the sublimation transfers 16 along the feeder 21. The feeder 21 includes a feed path 42 along which the sublimation transfers 16 are conveyed. Guide walls 44 restrict transverse movement of the sublimation transfers 16 along the feed path 42.

Figure 6:
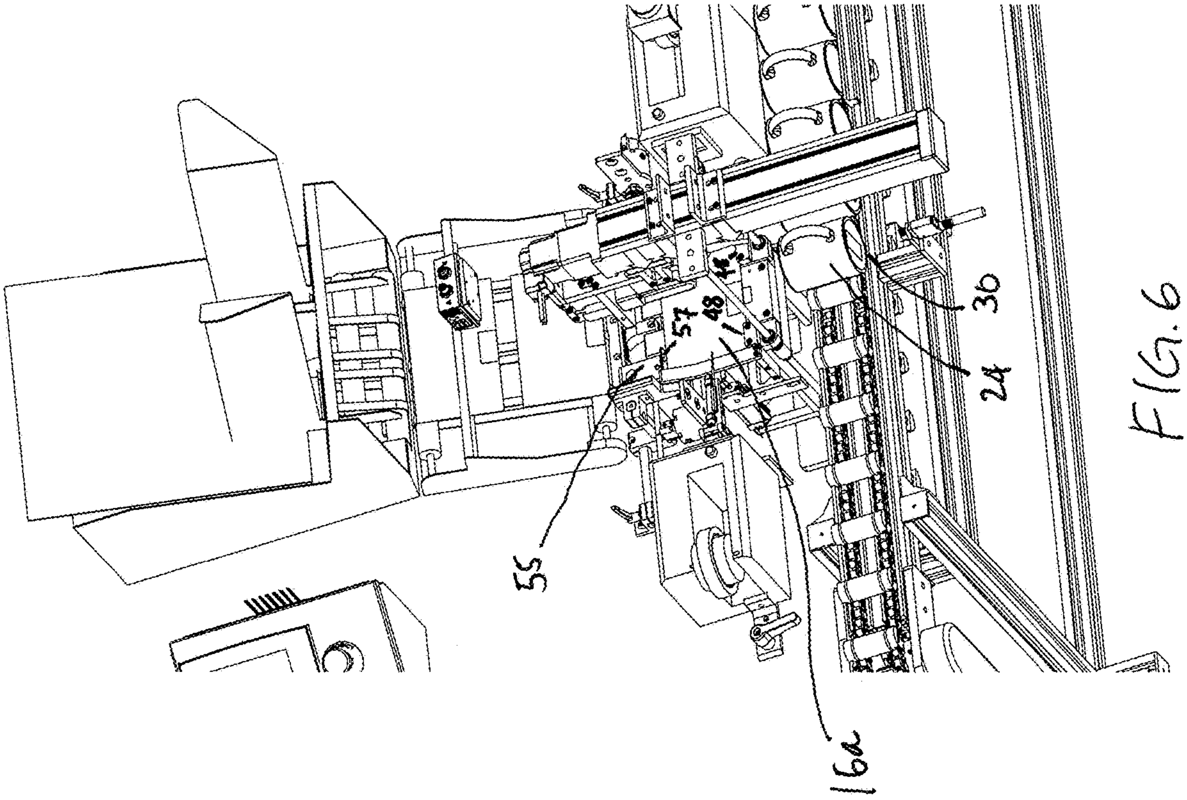

The feed path 42 directs the sublimation transfers 16 to the transfer platen 18. Edge guides 46 are located along the transfer platen 18 to guide movement of a sublimation transfer 16 onto the support surface 20, with stop edges 48 limiting the movement of the sublimation transfer 16 across the support surface 20. As the sublimation transfer 16 moves toward the stop edge 48, lateral portions of the sublimation transfer 16 are fed under side clamps 50 located along opposing edges of the transfer platen 18. The edge guides 46 and the stop edge 48 collectively align the sublimation transfer 16 on the support surface 20 with the side clamps 50 limiting curling or other upward movement of the lateral portions of the sublimation transfer 16. The sublimation transfer 16 positioned, in proper alignment, on the support surface 20 (as shown in FIG. 6) is referenced as a target sublimation transfer 16*a*.

An optical reader or scanner 52 may be located at the intake 14 or along the feed path 42 arranged to optically scan the computer readable indicia 38 of any sublimation transfers 16 passing thereby. Preferably, the sublimation transfers 16 are conveyed along the feed path 42 with the customized design facing up and the labels 36 facing up. The sublimation transfers 16 preferably have axial length greater than what is required (i.e., greater than the height of a target mug), providing additional space for accommodating the labels 36 outside of any design prepared thereon. With this arrangement, the optical reader 52 is placed above the feed path 42. The reading of the labels 36 allows for order tracking and the preparation of a secondary label 54 bearing secondary computer readable indicia 56, comparable to the computer readable indicia of 38. The secondary labels 54 may be printed using any known arrangement and applied to the closed bottoms of the mugs 24. As will be appreciated by those skilled in the art, the secondary labels 54 are applied to the mugs 24 in the same order as the sublimation transfers 16 are being fed along the feeder 21. This allows for the mugs 24 to have machine-readable indicia corresponding to the sublimation transfers 16 which will be fixed thereto. Once sublimation printing is completed, the finished mugs 24 may be tracked for order fulfillment based on the secondary labels 54.

Figure 4:
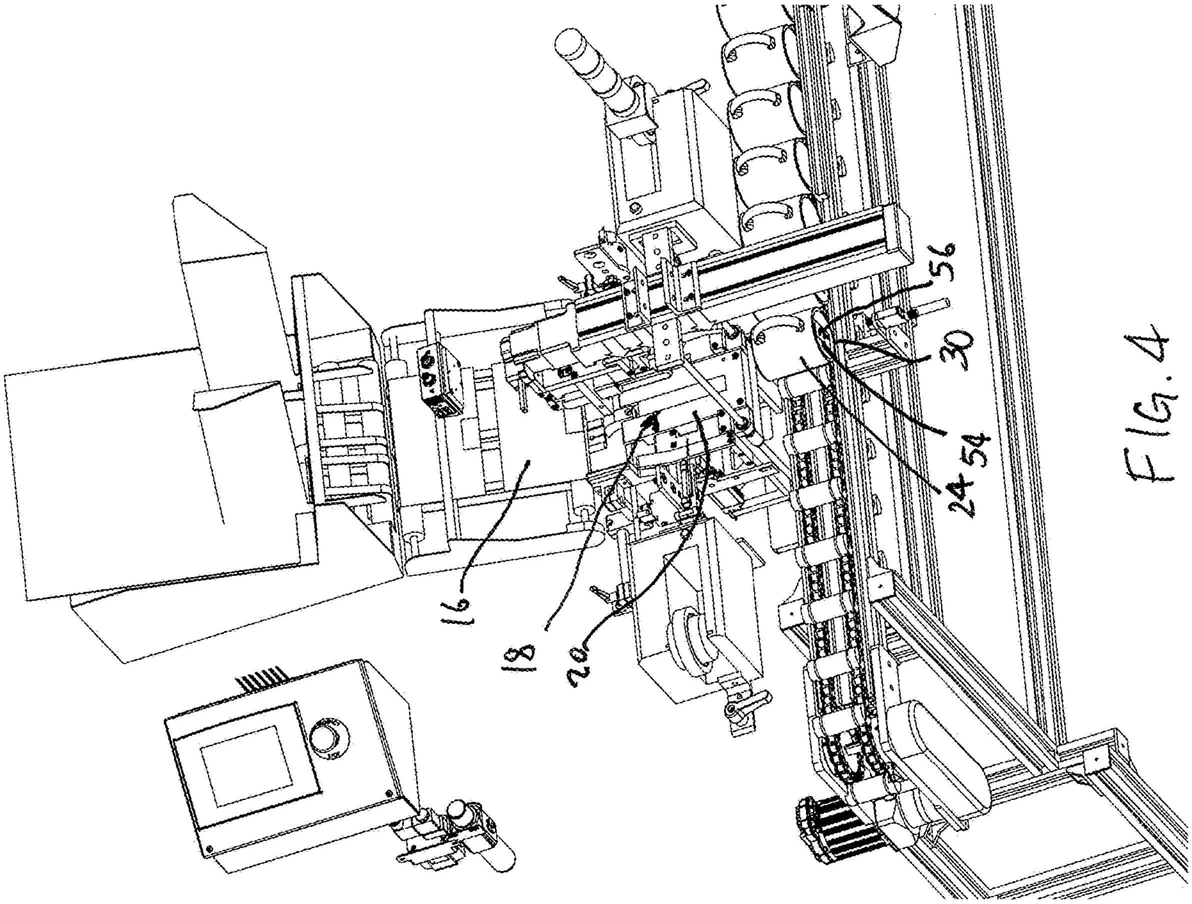
Figure 5:
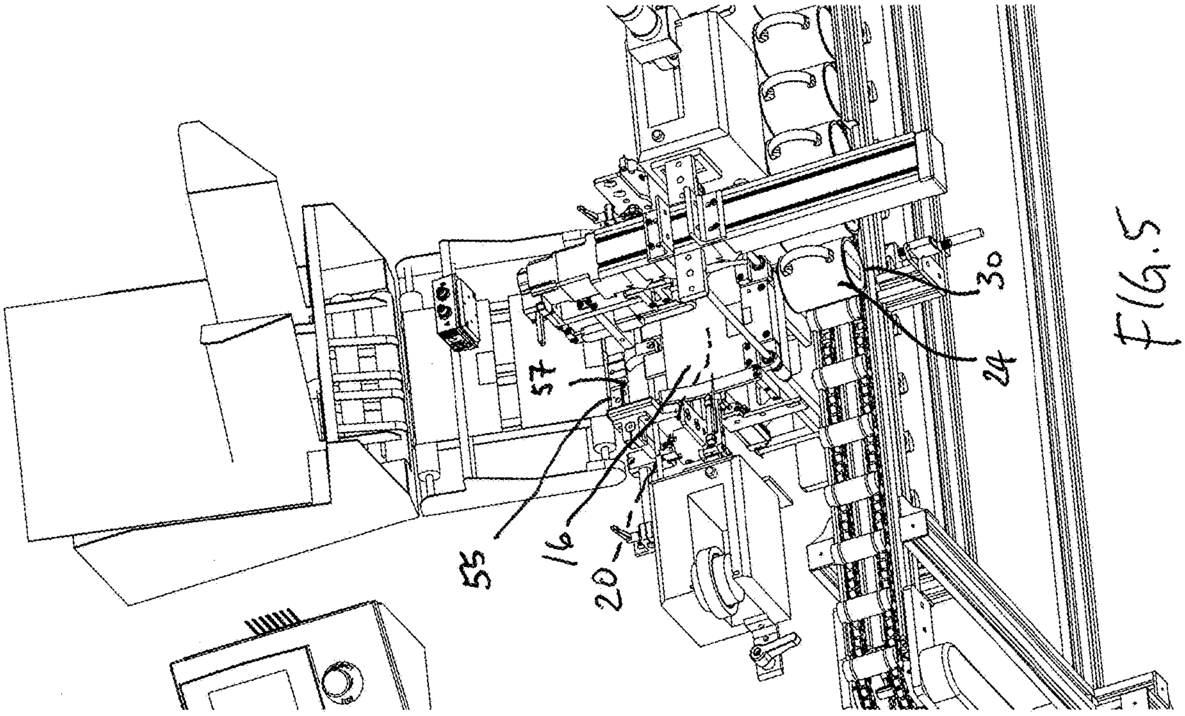

The linear actuator 22 is positioned to move mugs 24 from the loading position 30 on the conveyor 12 to a target location 58 located above the transfer platen 18, particularly above the support surface 20. FIG. 4 shows one of the mugs 24 in the loading position 30. In preparation for the mug 24 in the loading position, as shown in FIG. 5, one of the sublimation transfers 16 is urged onto the support surface 20 of the transfer platen 18. To best ensure proper alignment, pushers 55 may be brought forward (FIG. 6) to press the sublimation transfer 16 against the stop edges 48. The pushers 55 may be each provided with an upstanding flange 57 defining a leading face for engaging the sublimation transfer 16.

Figure 7:
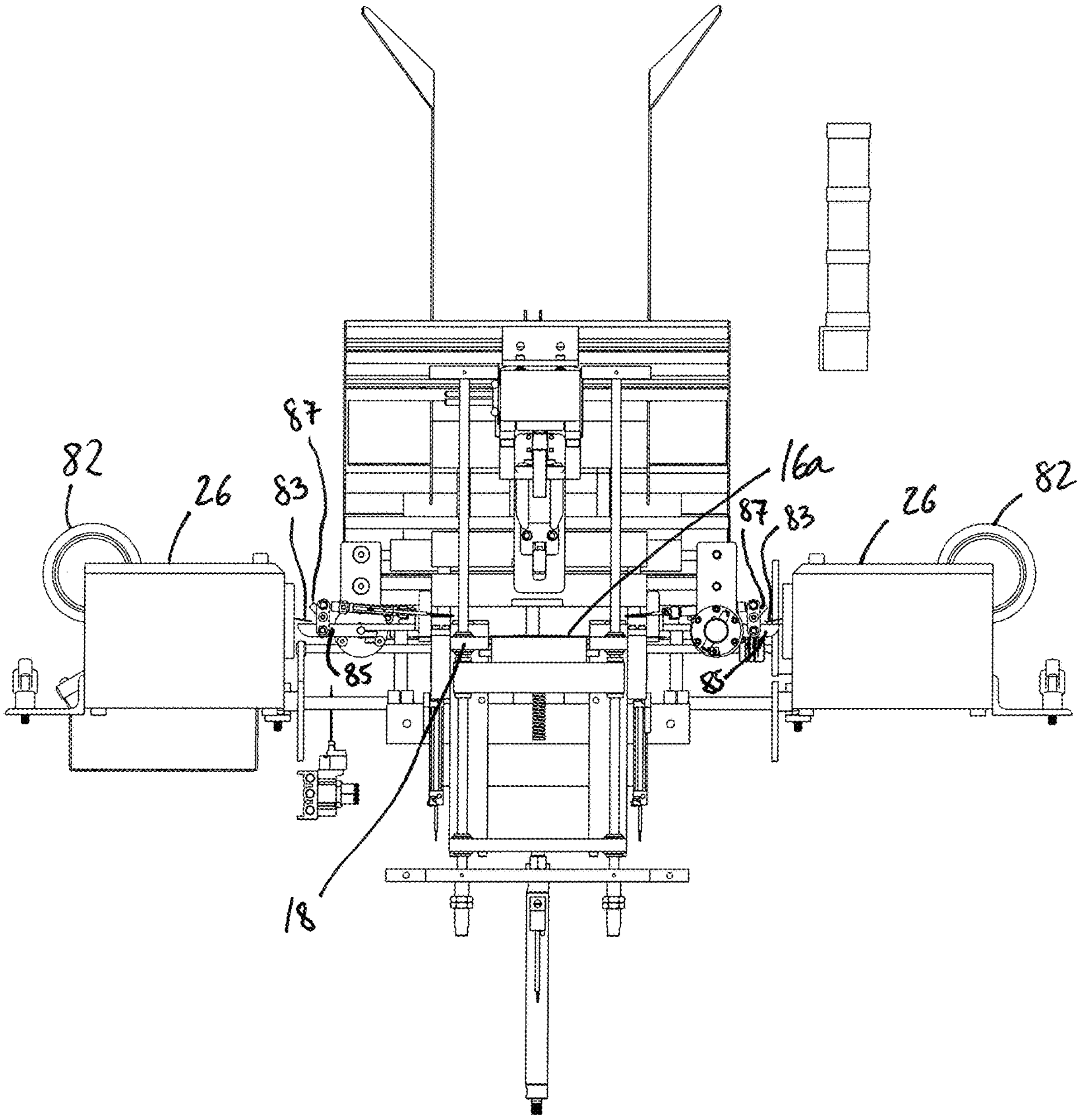
Figure 8:
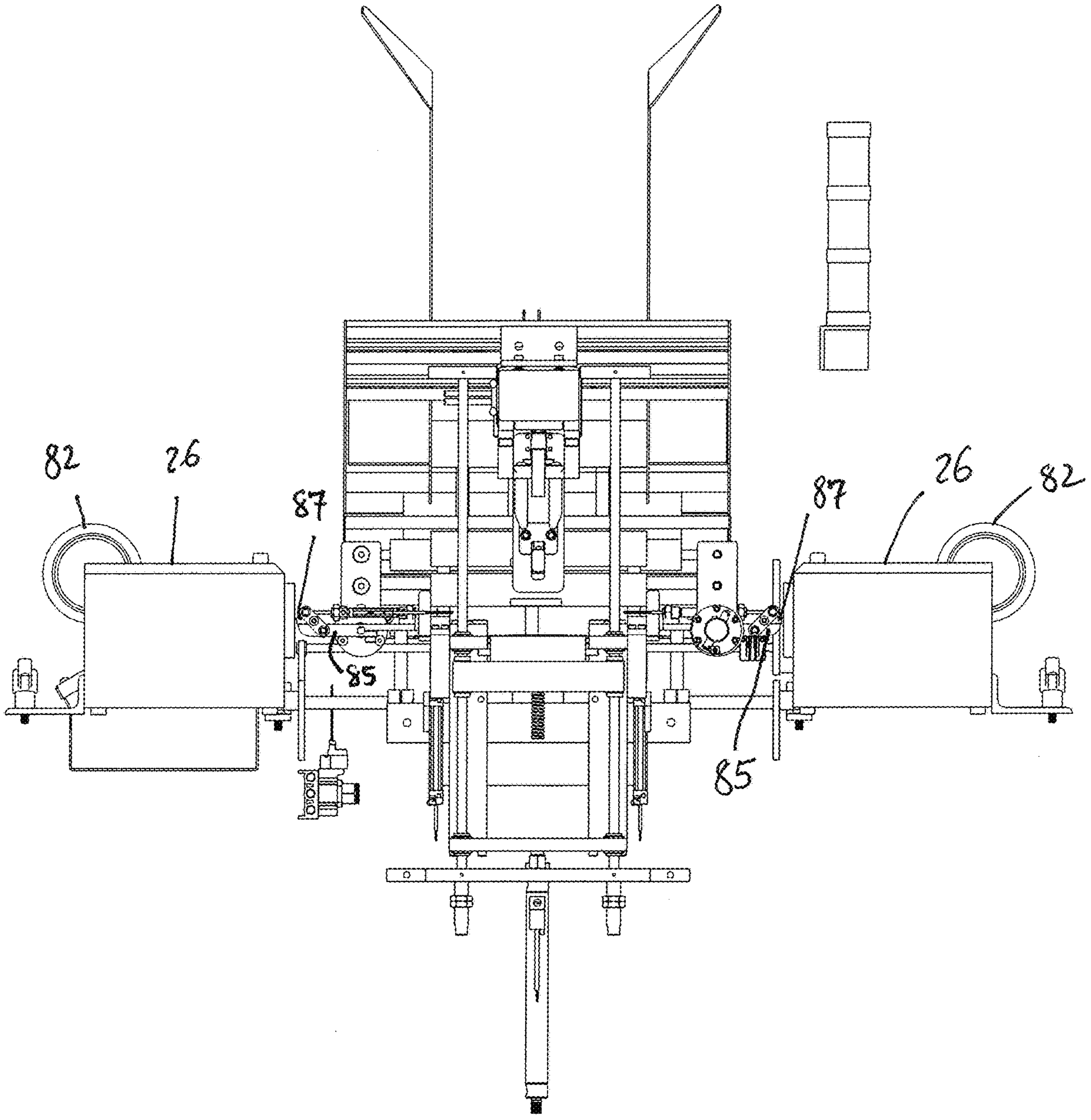
Figure 9:
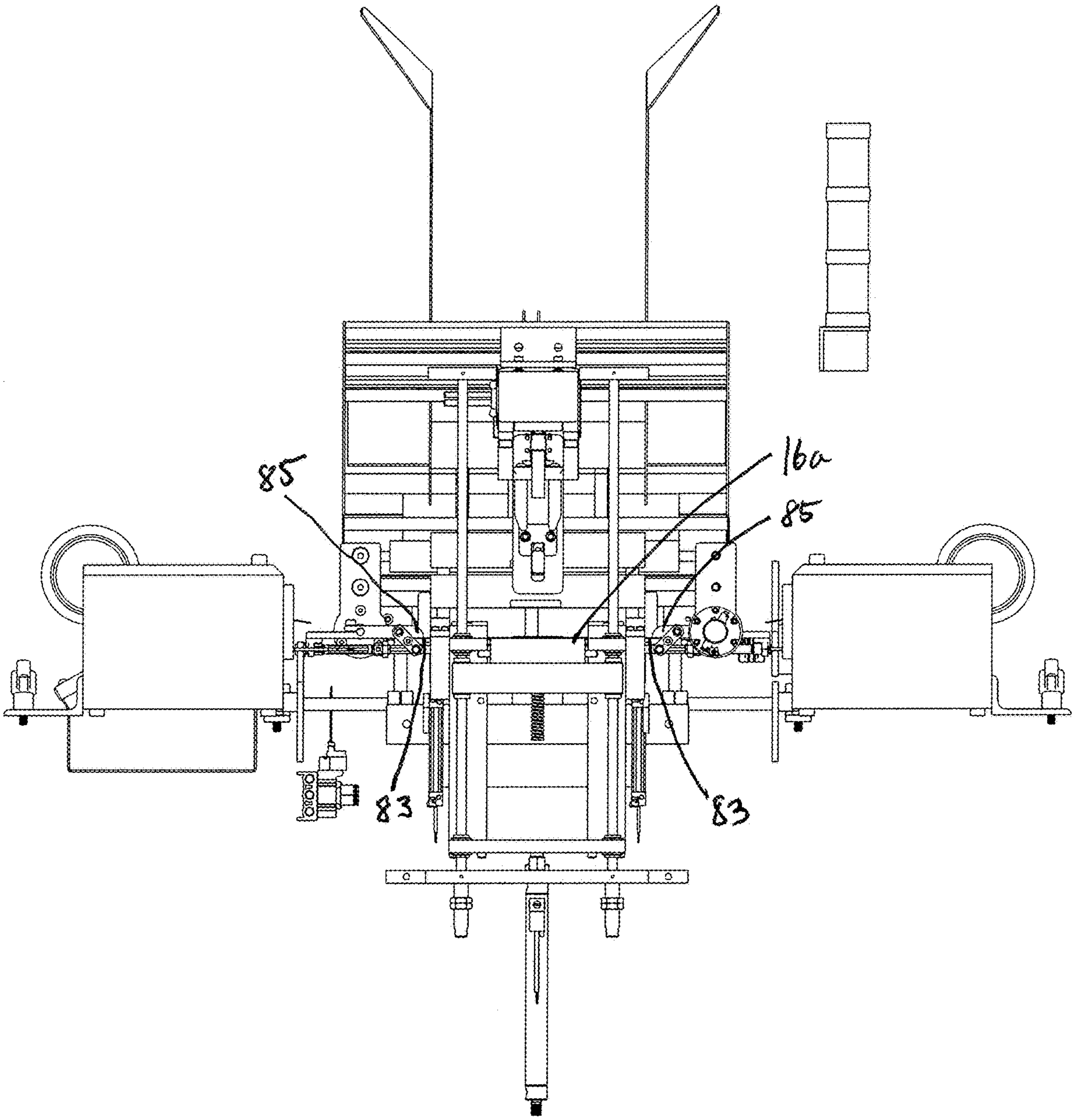
Figure 10:
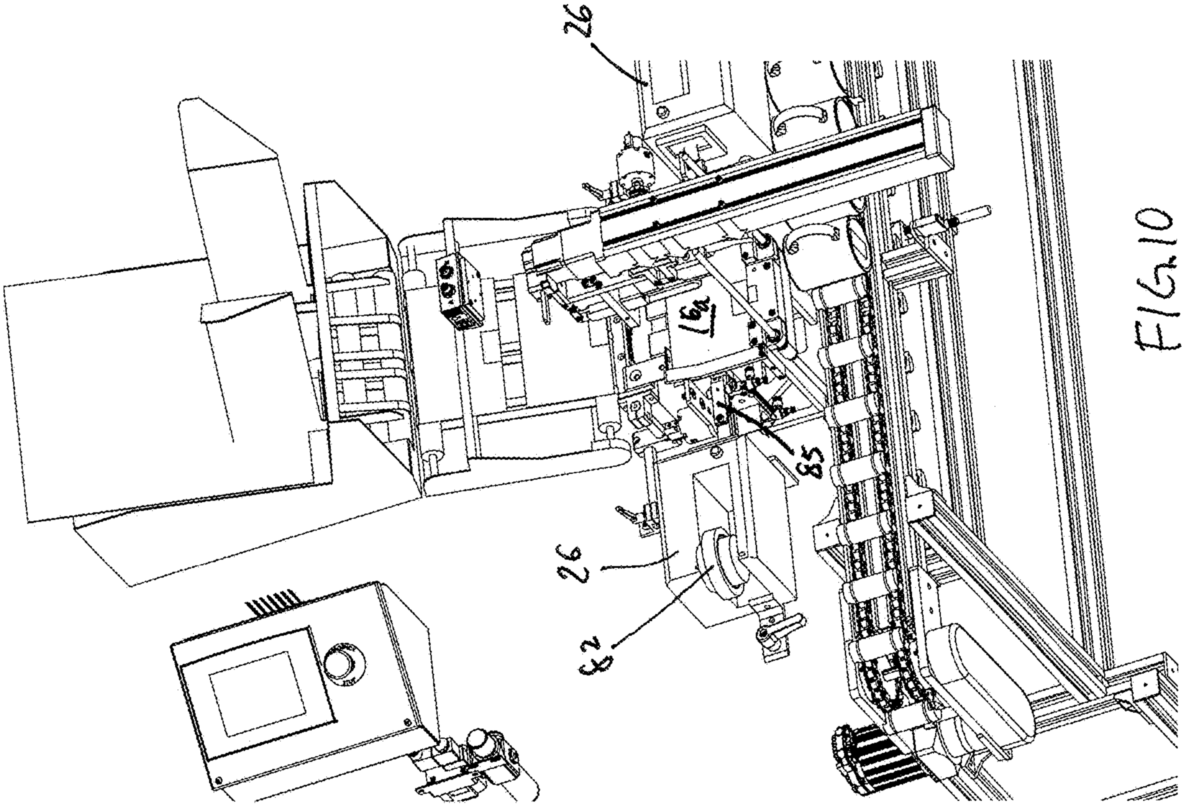

As shown in FIGS. 7-10, the first and second tape applicators 26 are located to be on opposing sides of the transfer platen 18, adjacent to the lateral portions of the target sublimation transfer 16*a*. Each of the tape applicators 26 includes a supply of heat-resistant tape 82, which may be in the form of a roll of tape. In addition, each of the tape applicators 26 includes a configuration to pay out tape from the respective supply 82 and to cut pre-defined lengths of tape 83, as shown in FIG. 7. Rotatable clamps 85 are provided for clamping the cut lengths of tape 83 and applying same to the target sublimation transfer 16*a*. As shown in FIG. 7, the rotatable clamps 85 each have a jaw 87 which is initially open. In FIG. 8, with the cut lengths of tape 83 paid out and cut, the jaws 87 are closed, thereby gripping the cut lengths of tape 83. Optionally, the jaws 87 may be each provided with a sharp implement, such as a cone point set screw or the like, for piercing the cut lengths of tape 83. The piercing provides enhanced grip of the cut lengths of tape 83, particularly in removing from the tape applicators 26. With the cut lengths of tape 83 gripped, the clamps 85 are rotated to apply the cut lengths of tape 83 to the target sublimation transfer 16*a*, as shown in FIGS. 9-10. The tape applicators 26 may be each an electronic tape dispenser programmed to pay out and cut a predetermined length of tape, such as that sold as Model zcM100 by Start International, Addison, Texas. As discussed above, it is preferred that the customized design side of the target sublimation transfer 16*a* be face up on the support surface 20. The cut lengths of tape 83 are applied to the bottom (non-design side) of the target sublimation transfer 16*a* with the adhesive side of the tape being partially exposed and facing upwardly. The jaws 87 are thereafter released with the clamps 85 rotating back to the initial position for gripping a subsequent cut length of tape 83. With rotation, the cut lengths of tape 83 are released from any sharp implements pierced therethrough.

Figure 17:
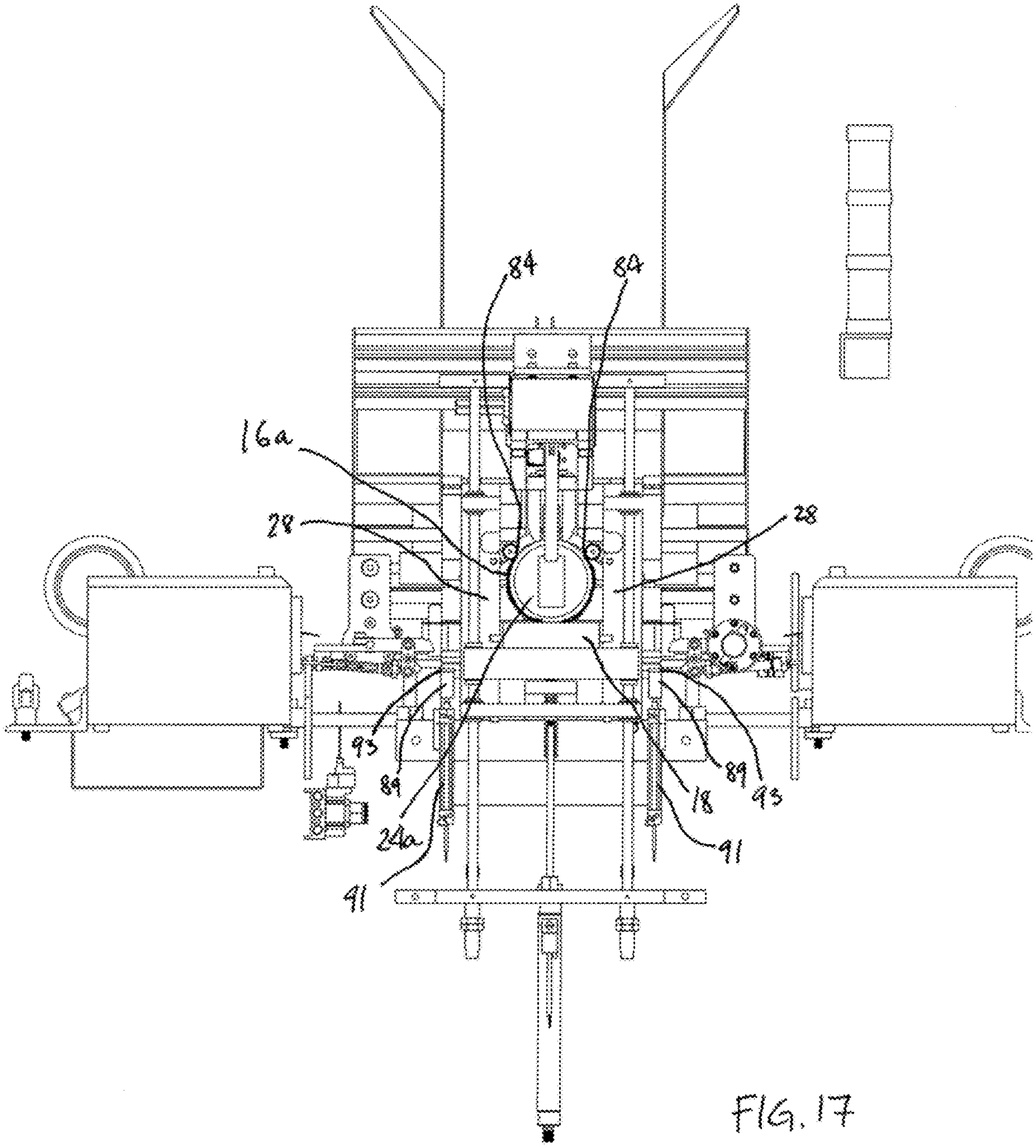

The clamps 85 are utilized to apply the cut lengths of tape 83 to the target sublimation transfer 16*a*. Generally, the clamps 85 are positioned to the side of the target sublimation transfer 16*a* resulting in the cut lengths of tape 83 being applied under a force to the side of the target sublimation transfer 16*a*. To ensure good adherence of the cut lengths of tape 83, tape presses 89 may be utilized which are vertically adjustable configured to press the cut lengths of tape 83 from below, in alignment with, the target sublimation transfer 16*a*. This allows for direct pressure on the portions of the cut lengths of tape 83 adhered to the target sublimation transfer 16*a*. The tape presses 89 are located on opposing sides of the transfer platen 18, as shown in FIG. 17. The tape presses 89 are linearly driven by actuators 91 and each may be provided with a rubber pad or cushion 93 for pressing engagement with the cut lengths of tape 83. The side clamps 50 may be in vertical alignment with the tape presses 89 and provide counterforce to the pressing force in maintaining the target sublimation transfer 16*a* generally flat.

Figure 11:
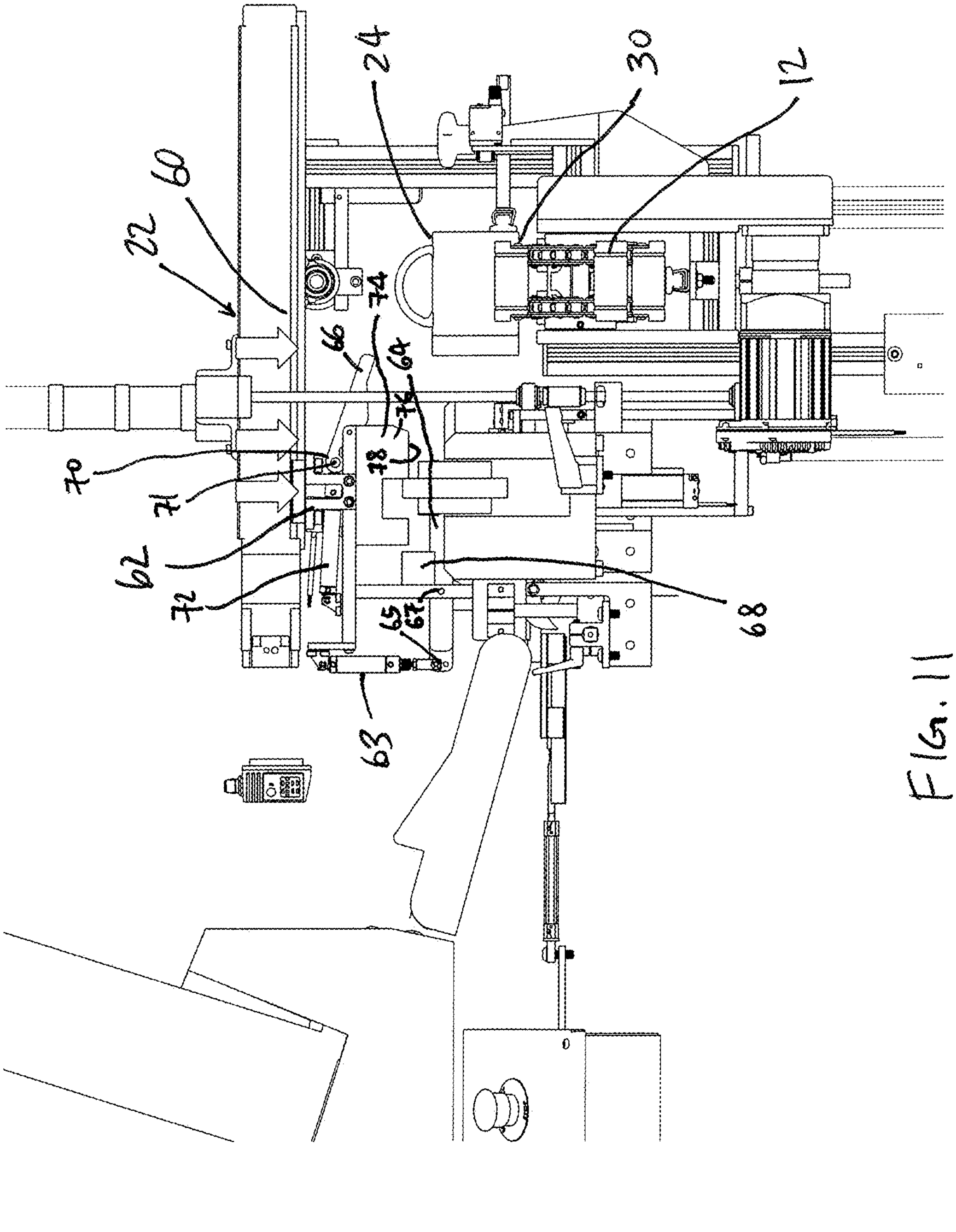
Figure 12:
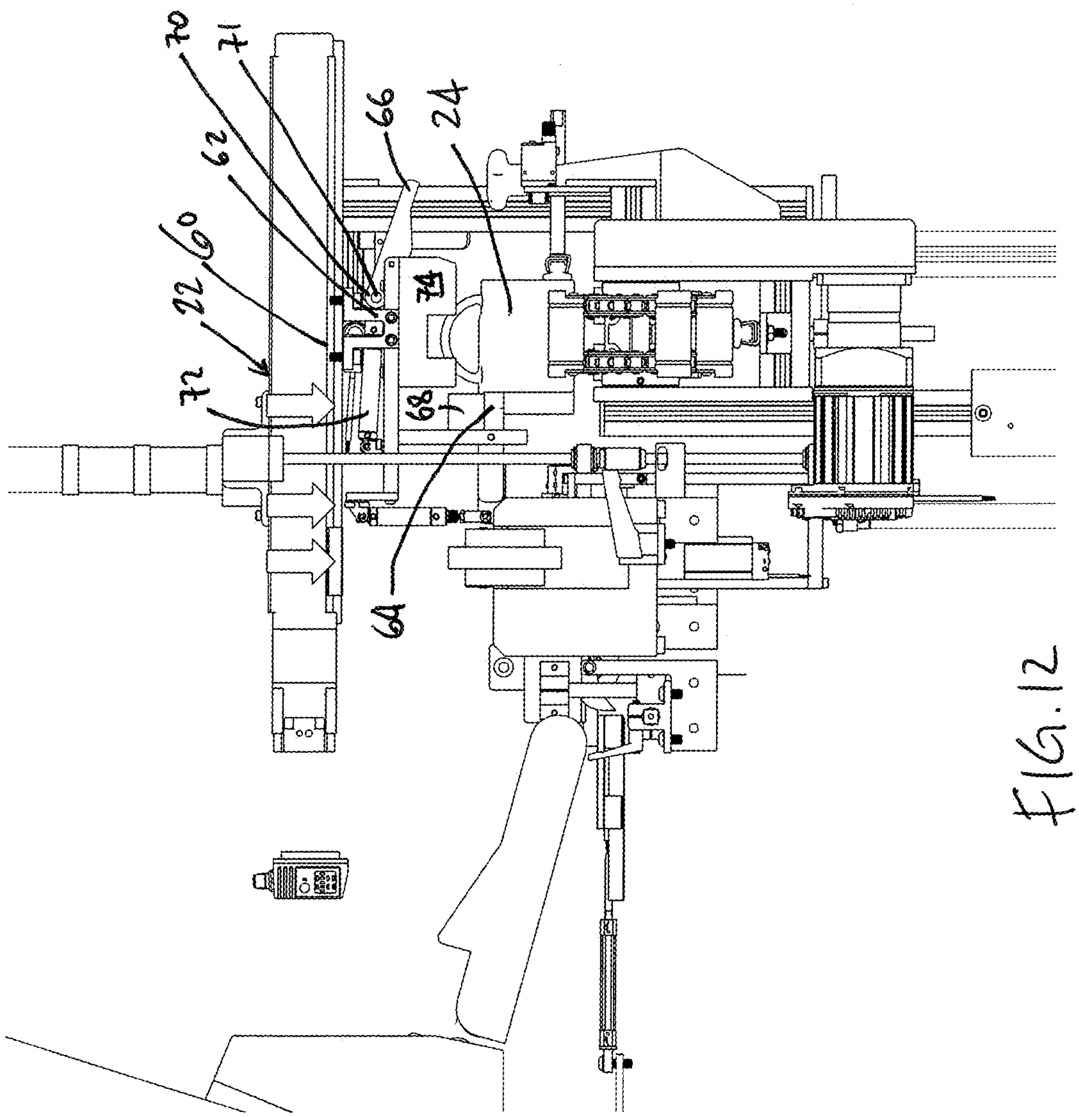
Figure 13:
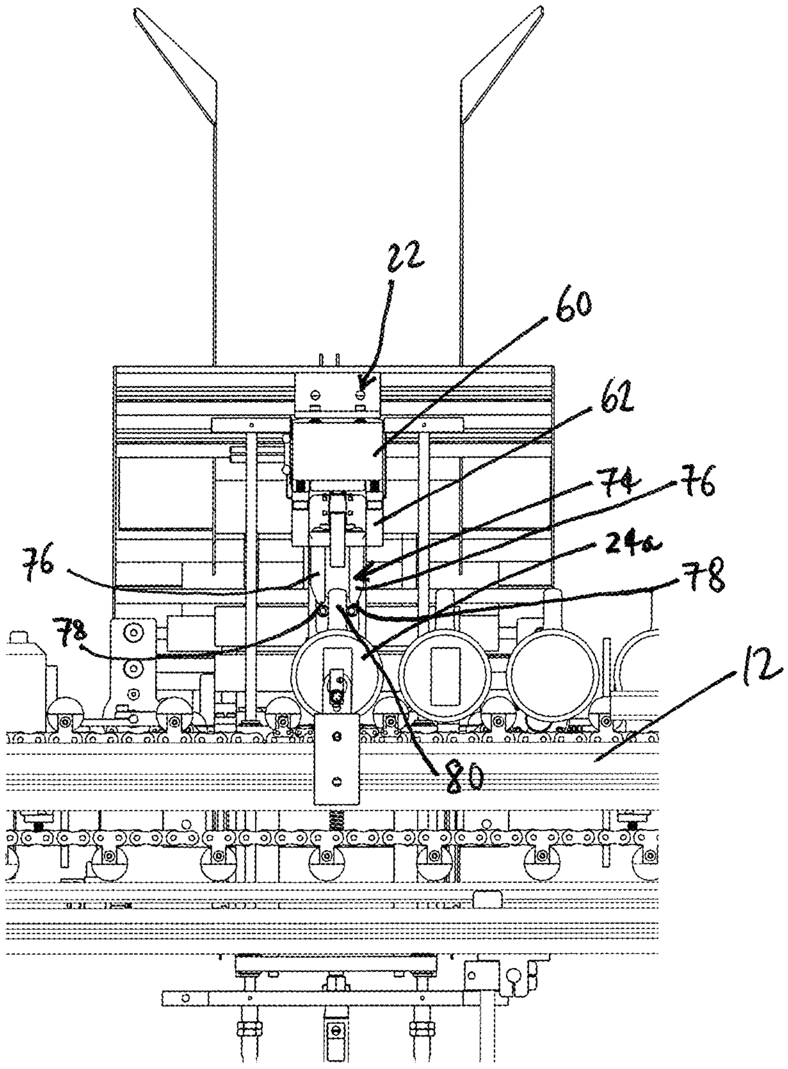
Figure 14:
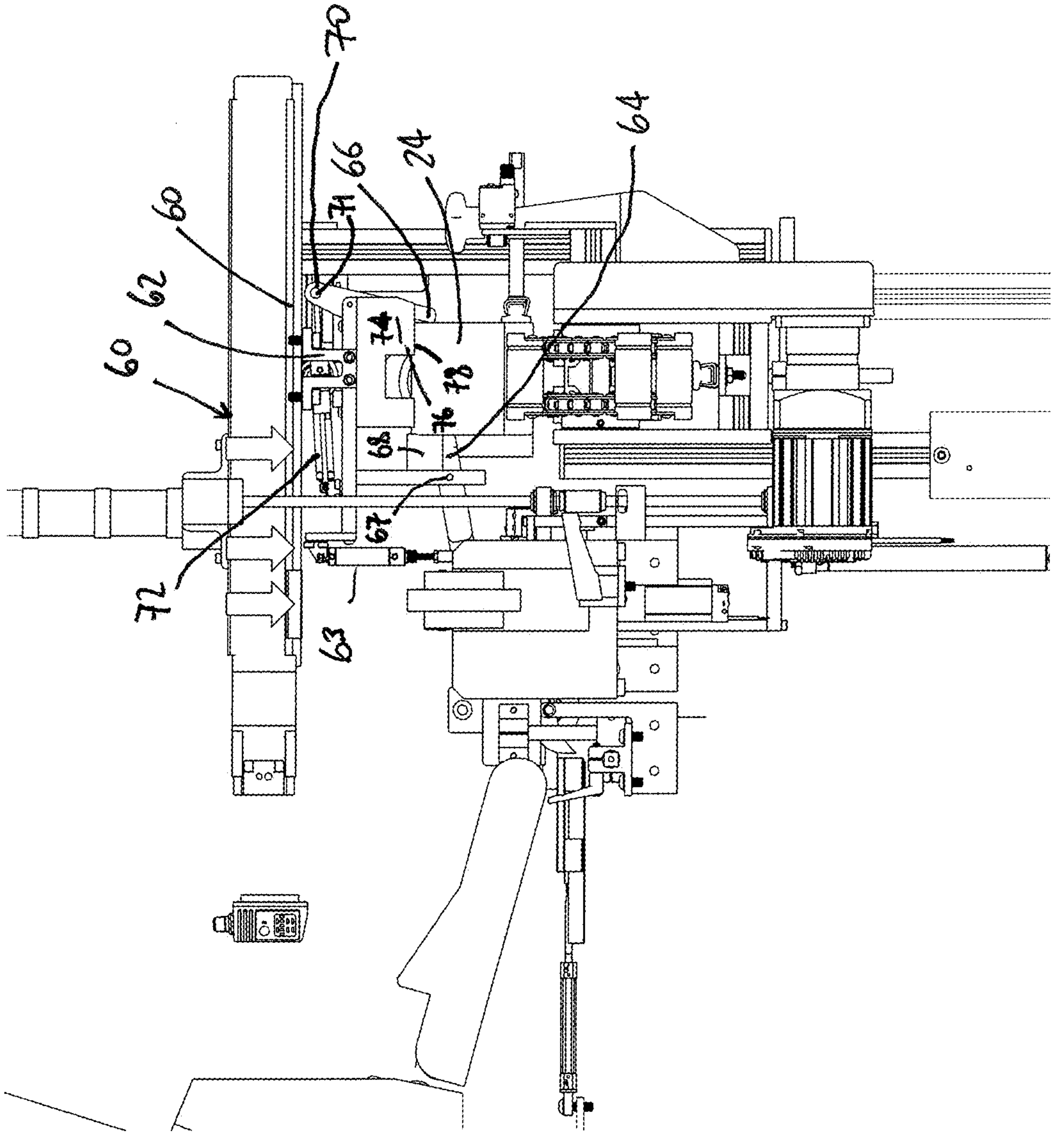
Figure 15:
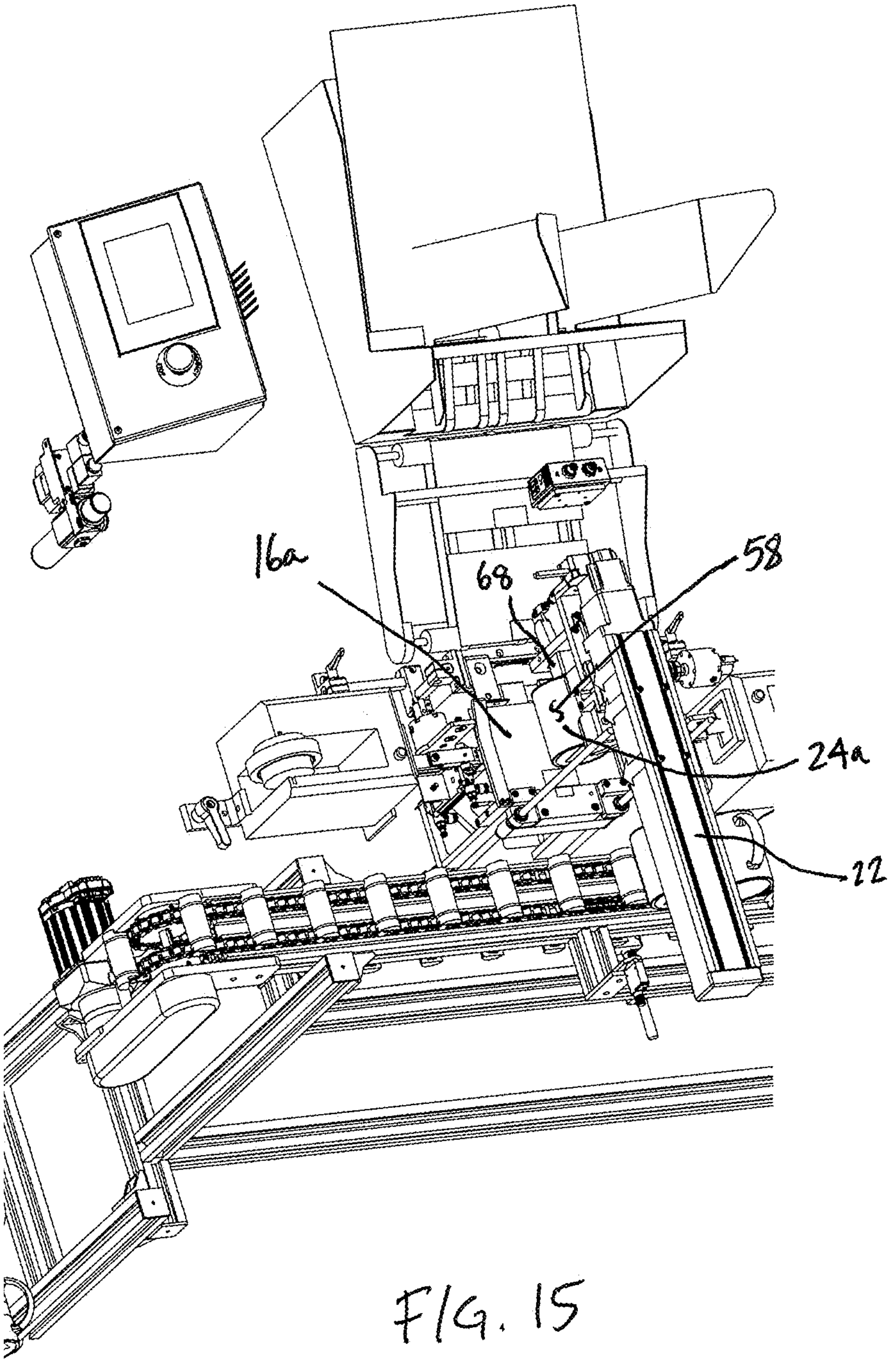

The linear actuator 22 may include a rail 60 located to extend across the conveyor 12 and the transfer platen 18. A carriage 62 is mounted to the rail 60 to be movable along the length thereof. The carriage 62 may be moved by any form of motive force, including, but not limited to, a screw drive, pneumatic piston, rack and pinion, and so forth, which allows for bi-directional movement along the rail 60. FIG. 11 shows the carriage 62 in a home position with one of the mugs 24 being in the loading position 30. A finger 64 is mounted to the carriage 62 so as to be insertable into the open end of a mug 24 located at the loading position 30 on the conveyor 12, with movement of the carriage 62 towards the loading position 30, as shown in FIG. 12. Preferably, the finger 64 is pivotally mounted to the carriage 62 so that upward rotation of the finger 64 causes the mug 24 located at the loading position 30 to be lifted by the finger 64, when inserted therein, as shown in FIG. 14. Once lifted, as shown in FIG. 15, the carriage 62 moves to the target location 58 above the transfer platen 18 with the mug 24, now being identified as the target mug 24*a*, being moved therewith. It is preferred that the finger 64 be dimensioned such that the point of contact between the finger 64 and the mug 24, in the lifted position, is closer to the closed end of the mug 24 than the open end of the mug 24. A bi-directional linear drive 63 may be mounted to the carriage 62 to cause upward and downward movement of rear end 65 of the finger 64 to cause pivotal movement of the finger 64 about pivot 67.

To best ensure stability of the target mug 24*a* in the target location 58, a clamping finger 66 may be provided on the carriage 62 which is actuatable to press against the closed end of the target mug 24*a* whilst moving to the target location 58. In addition, a stop block 68 may be provided on the carriage 62 in alignment with a portion of the rim of the target mug 24*a* so as to limit forward axial movement of the target mug 24*a* relative to the carriage 62. The clamping finger 66 is positioned to apply pressure to the target mug 24*a* so as to cause the target mug 24*a* to be in pressing engagement with the stop block 68. The clamping finger 66 may be pivotally mounted to the carriage 62 with rotational movement thereof controlled by displacement of an upper end 70 of the clamping finger 66. Pivotal movement of the clamping finger 66 allows for pressing engagement with the target mug 24*a* and release therefrom. A bi-directional linear drive 72 may be mounted to the carriage 62 to cause forward and backward displacement of the upper end 70 in causing pivotal movement of the clamping finger 66 about pivot 71. Pressure applied by the clamping finger 66 is generated by the linear drive 72.

To provide additional stability to the target mug 24*a* at the target location 58, an inverted U-shaped guide 74 may be provided on the carriage 62 having spaced-apart sidewalls 76 which define downward facing stop surfaces 78 at free ends thereof. The sidewalls 76 are positioned to register with a handle 80 of the target mug 24*a* when located at the loading position 30 on the conveyor 12. With movement of the carriage 62 towards the loading position 30, the handle 80 is received within the guide 74 such that the guide 74 limits rotational movement of the target mug 24*a* in the target location 58. The handle 80 is maintained within the guide 74 with movement of the carriage 62 between the loading position 30 and the target location 58.

The finger 64 may be configured to press the mug 24, upon lifting, into pressing engagement with the stop surfaces 78, as shown in FIG. 14, for additional stability.

As shown in FIG. 15, the target location 58 is centrally positioned over the support surface 20 so that a central portion of the target sublimation transfer 16*a*, positioned on the support surface 20, is aligned with a central longitudinal axis of the target mug 24*a*. The linear actuator 22 is configured to repetitively deliver target mugs 24*a* to the target location 58. In this manner, the target mug 24*a* is positioned to be wrapped by the target sublimation transfer 16*a*. The alignment of the target mug 24*a* with the sublimation transfer 16 is important to ensuring that the customized design is later properly printed onto the target mug 24*a*. Misalignment, resulting in skewed wrapping, off-center wrapping, and the like, will cause the customized design to not be properly applied to the circumference of the mug, resulting in waste. Misalignment of the handle 80 of the target mug 24*a* relative to the longitudinal axis of the target mug 24*a* (i.e., the handle 80 is askew to the longitudinal axis) may also present issues resulting in radial misalignment, incomplete wrapping, and the like. Mugs with handles askew to the respective longitudinal axis should be removed from processing. As will be appreciated by those skilled in the art, the target location 58 can be adjusted in response to the size of one or both of the mug and sublimation transfer. The target location 58 can be axially adjusted along an axis of the rail 60, as needed.

In addition, it is preferred that the sublimation transfers 16 be cut to the same size for a run or batch of processing. The transfer platen 18 may be adjusted to the selected size (e.g., one or more of the feed path 42, the edge guiders 46, the stop edges 48, the side clamps 50, the pushers 55 may be adjusted) to ensure repeated proper alignment of the sublimation transfers 16 on the transfer platen 18. Multiple runs may be conducted allowing for different sized sublimation transfers 16 and/or different sized mugs 24.

Figure 16:
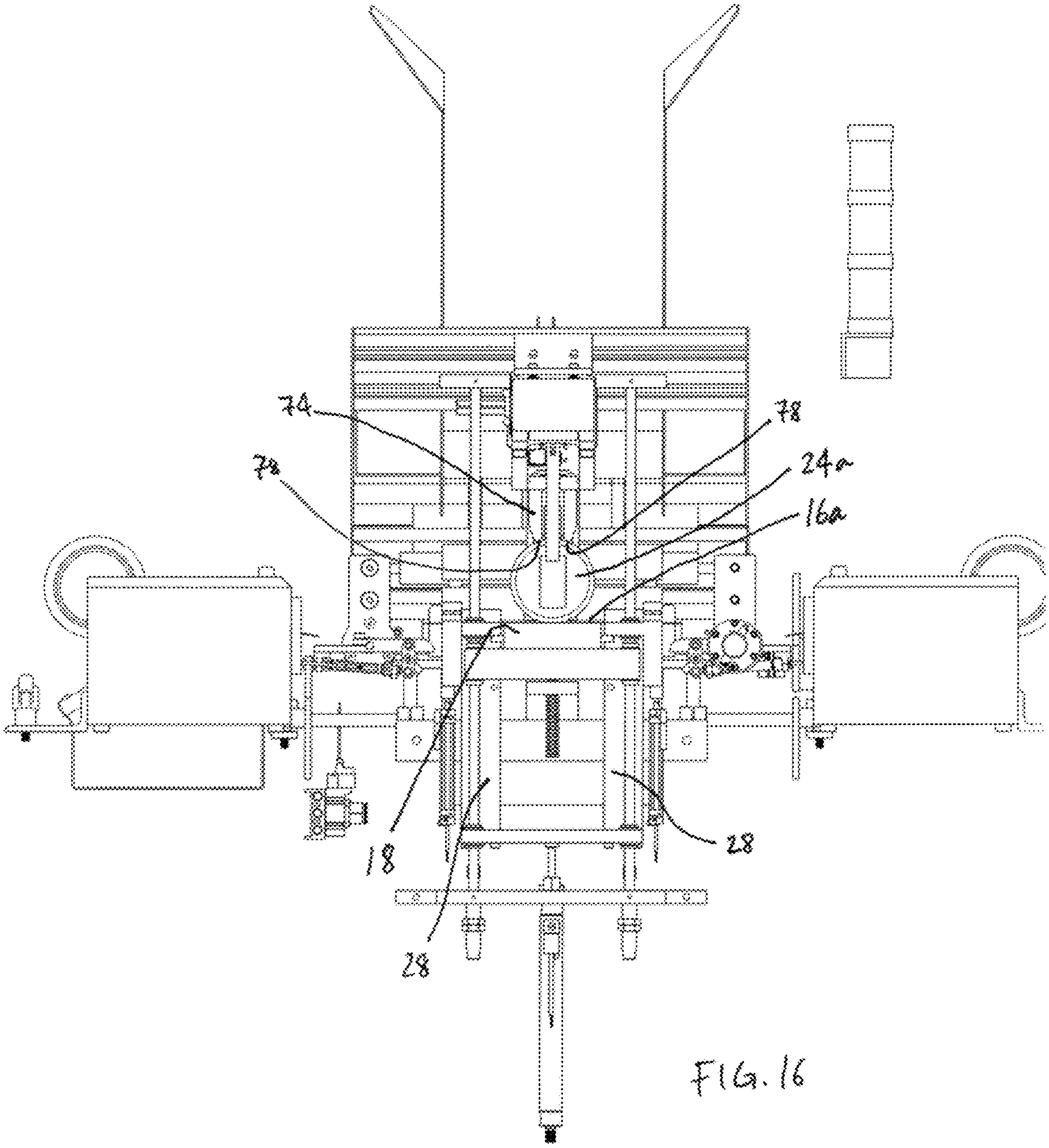
Figure 18:
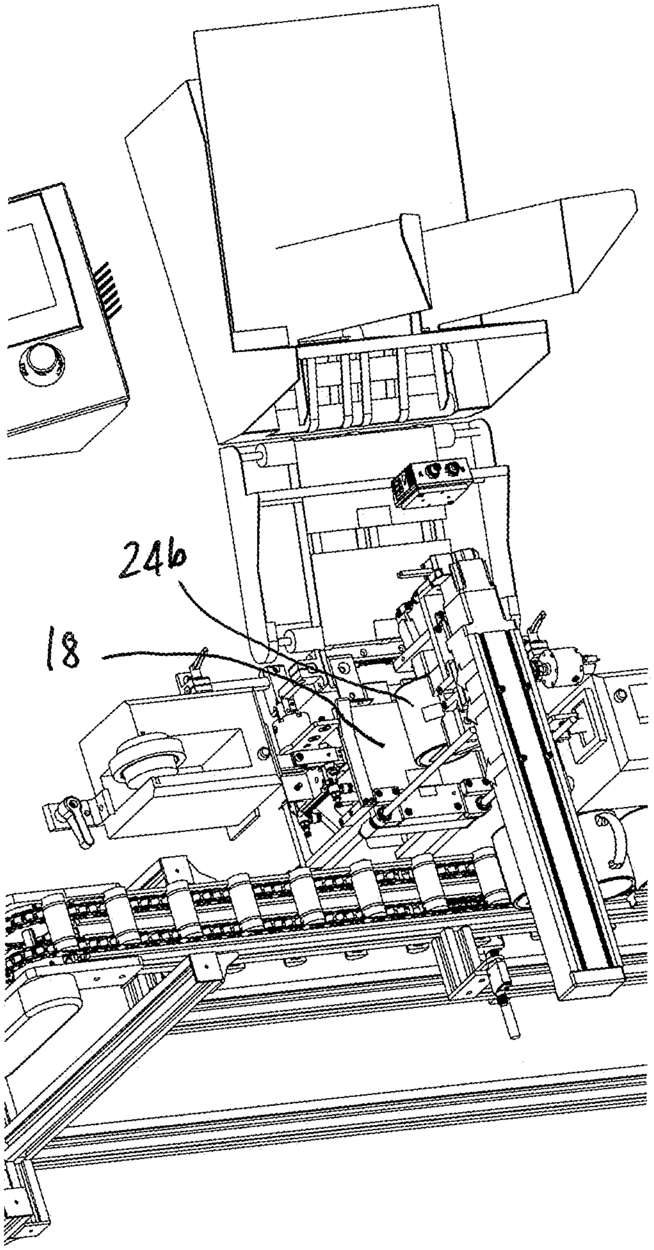
Figure 19:
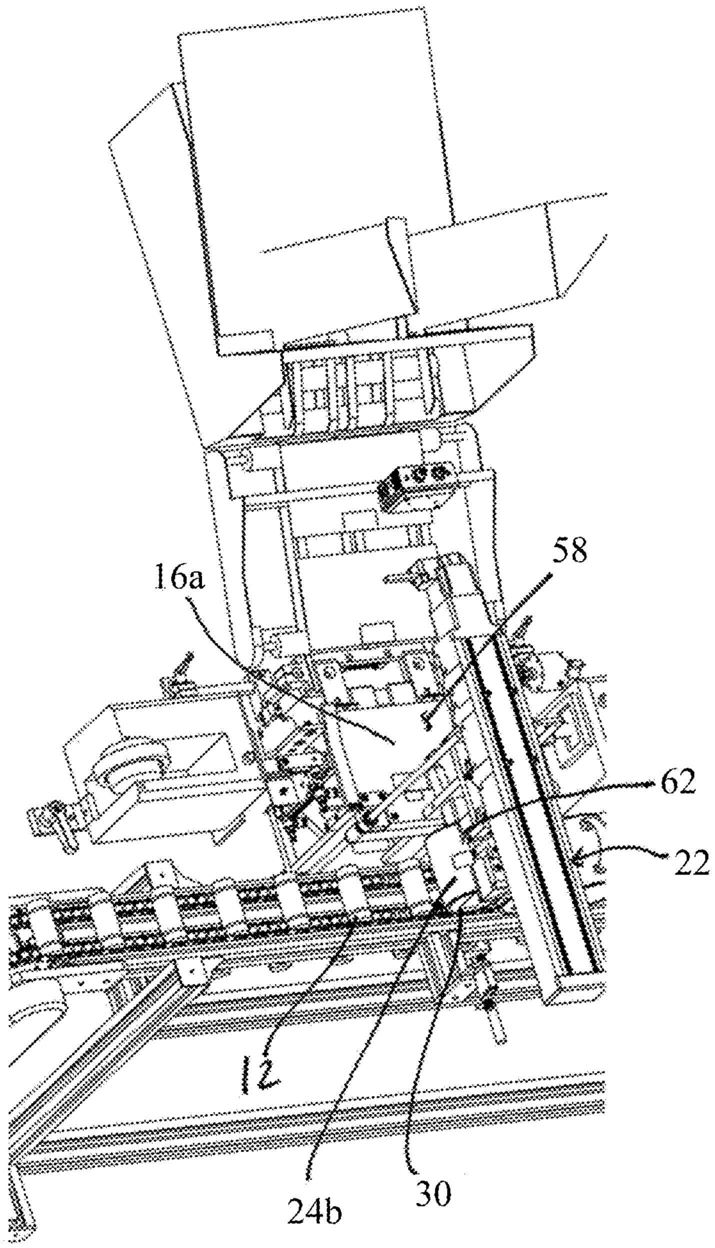
Figure 20:
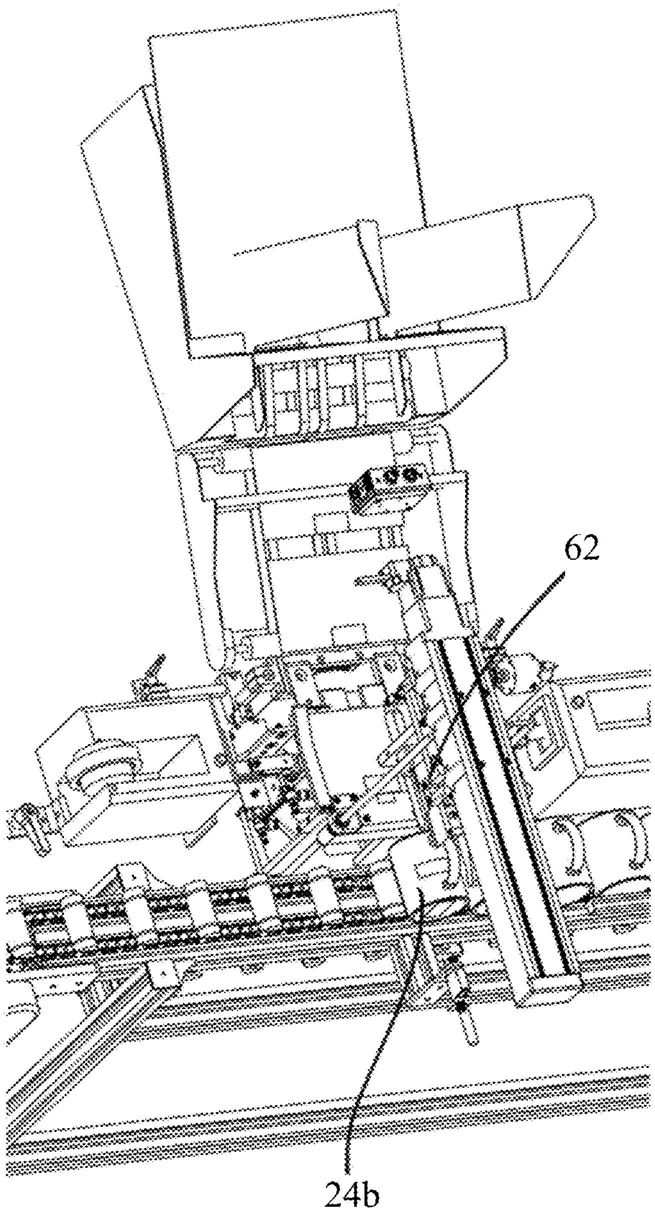

With the target mug 24*a* in the target location 58 and tape having been applied to the target sublimation transfer 16*a*, the transfer platen 18 may be caused to elevate to press a central portion of the target sublimation transfer 16*a* against the target mug 24*a*, as shown in FIG. 16. The stop surfaces 78 of the guide 74 may limit upward movement of the target mug 24*a* in response to the pressing force of the transfer platen 18. The side clamps 50 may be adjusted (rotated, shifted) to fully expose the target sublimation transfer 16*a*. Subsequently, the first and second wrapping arms 28 are caused to elevate relative to the transfer platen 18 so as to vertically extend upwardly therefrom. The first and second wrapping arms 28 are initially located to be coplanar with the transfer platen 18, aligned with lateral portions of the target sublimation transfer 16*a* (FIG. 16). With the first and second wrapping arms 28 rising above the transfer platen 18, the lateral portions of the target sublimation transfer 16*a* are caused to rise upwardly. Each of the first and second wrapping arms 28 includes an inwardly directed engagement surface 84 configured to press against the target sublimation transfer 16*a* with the rise of the first and second wrapping arms 28. The engagement surfaces 84 are configured to be biased inwardly (e.g., by spring force) to press the lateral portions of the target sublimation transfer 16*a* against the target mug 24*a* with the rise of the first and second wrapping arms 28. The engagement surfaces 84 may press inwardly above the diameter of the target mug 24*a*, i.e., press inwardly above the widest portion of the target mug 24*a* as viewed along the upward path of travel of the first and second wrapping arms 28. The engagement surfaces 84 provide a wrapping action of the target sublimation transfer 16*a* about the target mug 24*a*. The engagement surfaces 84 also press against the cut lengths of tape 83 causing the tape to come into adherent engagement with the target mug 24*a*. In this manner, the target sublimation transfer 16*a* is both wrapped about the target mug 24*a* and fixed thereto by the tape, yielding a prepared mug 24*b*. As shown in FIG. 18, once the prepared mug 24*b* is wrapped, the transfer platen 18 and the first and second wrapping arms 28 are caused to descend to the original starting positions. Thereafter, as shown in FIG. 19, the carriage 62 is caused to move the prepared mug 24*b* to the loading position 30. The clamping finger 66 is released and the finger 64 is lowered to lower the prepared mug 24*b* in placing the prepared mug 24*b* into the recess 32 of the conveyor 12 aligned with the loading position 30, with the carriage 62 returning to its initial position, as shown in FIG. 20.

The engagement surfaces 84 may be each defined on a roller which preferably is configured to roll only with the descent of the first and second wrapping arms 28 (i.e., one-way rollers). In this manner, the engagement surfaces 84 are static, non-moving surfaces with rising of the first and second wrapping arms 28. This allows for the engagement surfaces 84 to be in tight, non-slipping contact with the target sublimation transfer 16*a* during wrapping. Tight wrapping of the target sublimation transfer 16*a* is desired to minimize any gaps, best ensuring good contact and alignment of the design face of the wrapped sublimation transfer with the mug. The engagement surfaces 84 may also release from pressing engagement with the target mug 24*a* upon descending below the diameter of the target mug 24*a* (i.e., below the widest portion of the target mug 24*a* as viewed along the downward path of travel of the first and second wrapping arms 28).

With the customized design of the target sublimation transfer 16*a* being initially in a face-up position, the customized design is inwardly facing about the prepared mug 24 once wrapped. It is noted that the target sublimation transfer 16 is dimensioned to not come into contact with the handle 80 of the target mug 24*a*. This leaves a gap about the circumference of the target mug 24*a* where the tape is adhered directly to the target mug 24*a*. Moreover, it is preferred that a relief 86 be provided in each of the sidewalls 76 of the guide 74 positioned to be in alignment with an inner portion of the handle 80 of the target mug 24*a*. The reliefs 86 allow for the tape to be pressed into adherence within the target mug 24*a* without obstruction by the sidewalls 76. The reliefs 86 are sized to permit the engagement surfaces 84 to at least partially pass therethrough in ensuring good contact with the full length of the tape. It is also preferred that the sidewalls 76 be configured to engage the target mug 24*a* adjacent to, and on opposing sides, of the handle 80 and between the lateral portions of the target sublimation transfer 16*a* in the wrapped state. Thus, the pressing of the target mug 24*a* against the stop surfaces 78 does not interfere with the wrapping of the target sublimation transfer 16*a* about the target mug 24*a*.

Figure 21:
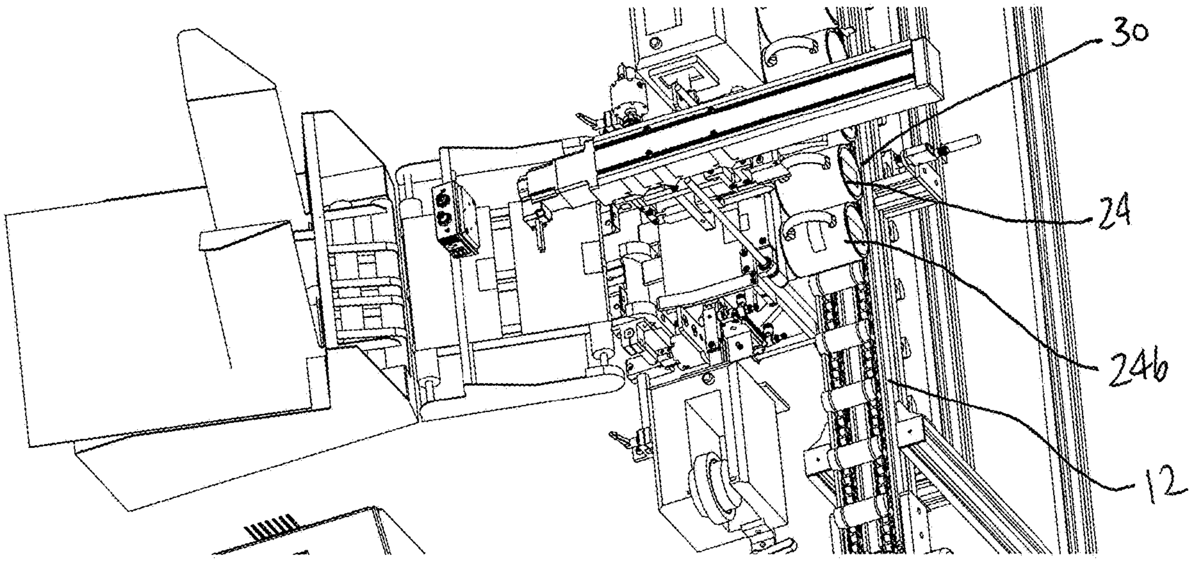

As shown in FIG. 21, the conveyor 12 is able to move the prepared mug 24 away from the loading position 30 with a subsequent mug 24 being moved into the loading position 24 ready for wrapping. With incremental advancement, the conveyor 12 allows for the removal and return of the mugs 24, for wrapping, with further conveyance of the prepared mugs. Continuous, automated processing is achievable with the system 10. In addition, one or more controllers (e.g., PLC controllers) may be utilized to synchronize the speed of the conveyor 12 relative to the wrapping process. The one or more controllers can be also configured to control the linear actuator 22 in positioning the target location 58. This allows for programmable re-positioning of the target position 58.

Figure 22:
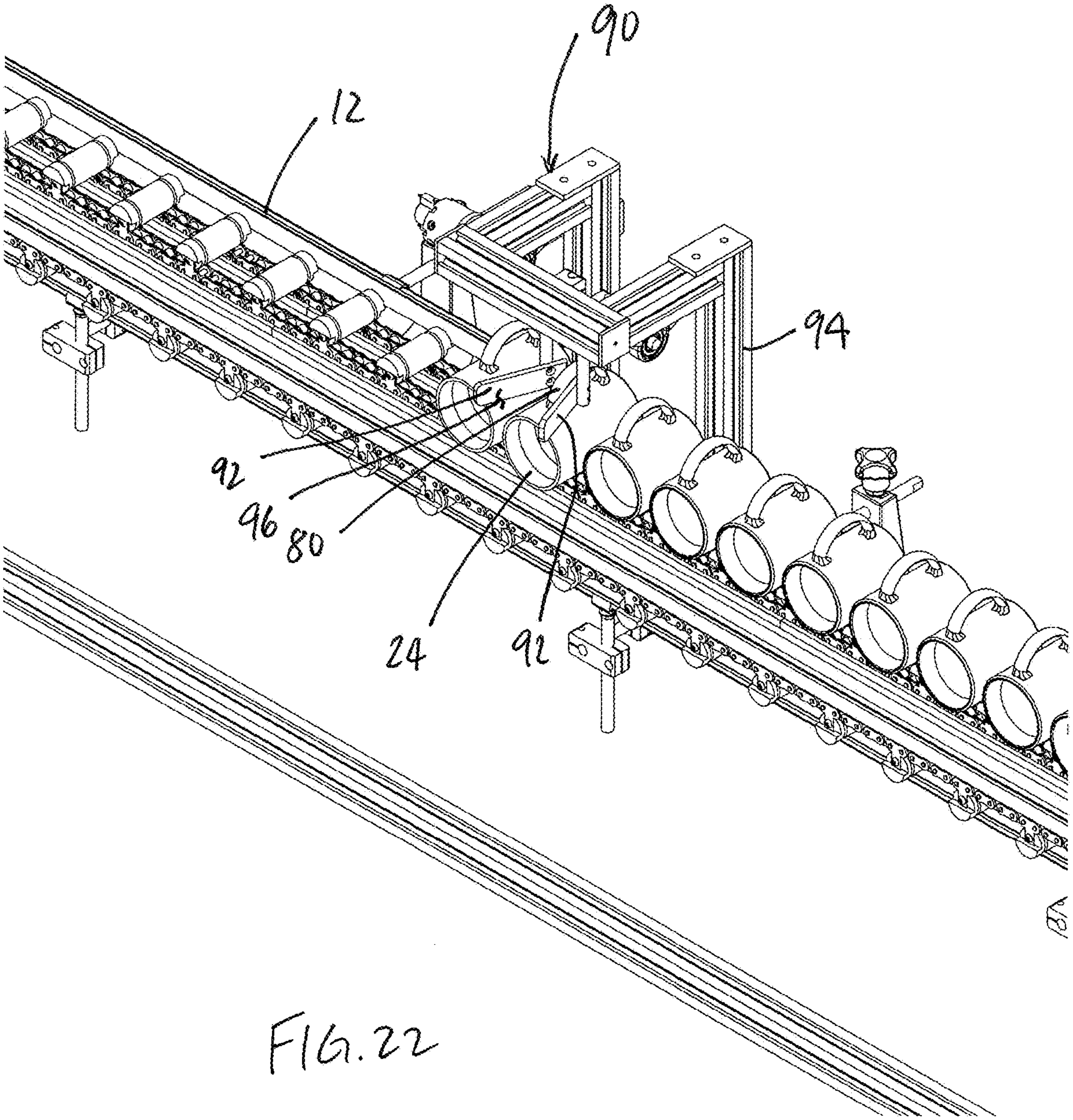
Figure 23:
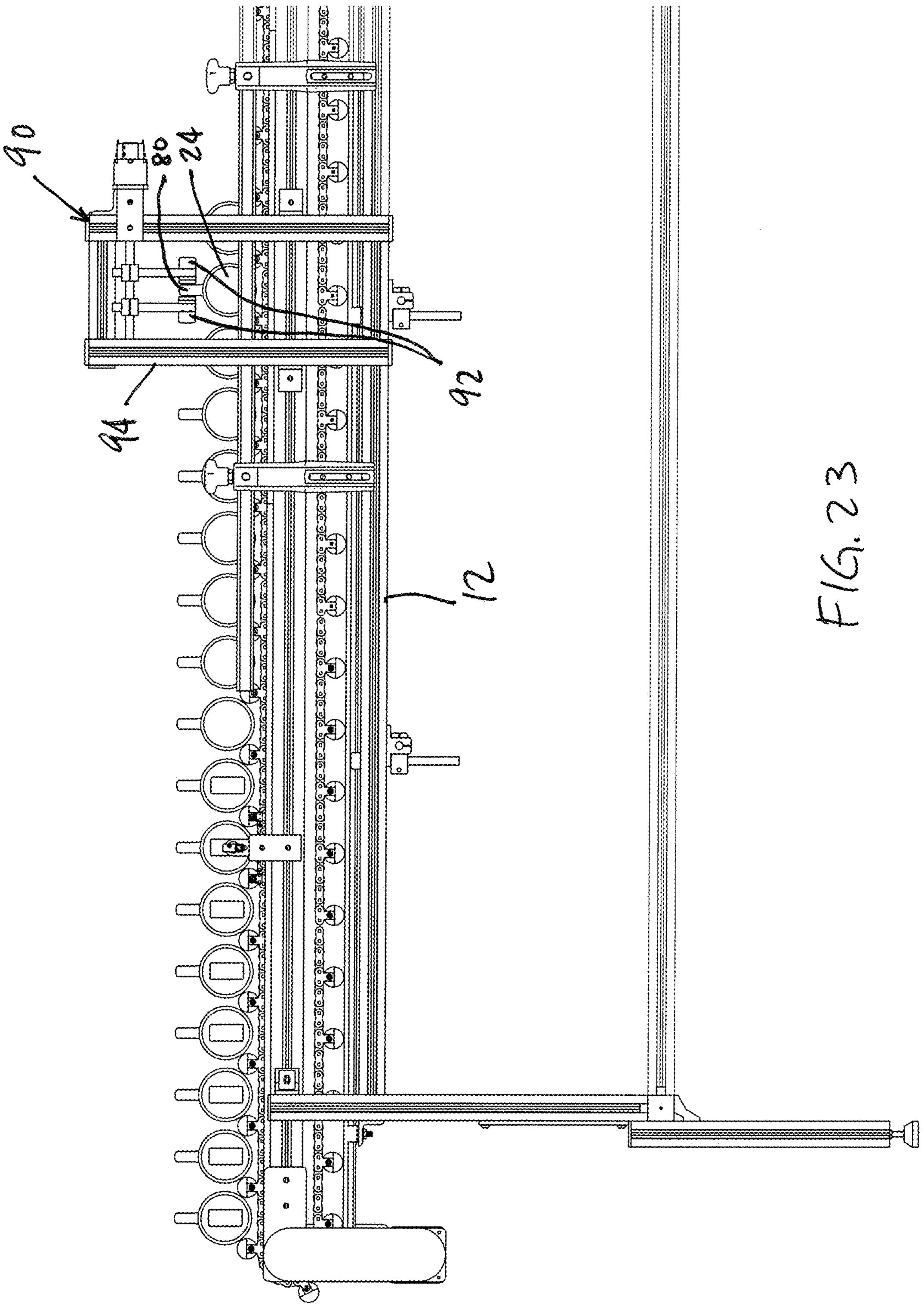
Figure 24:
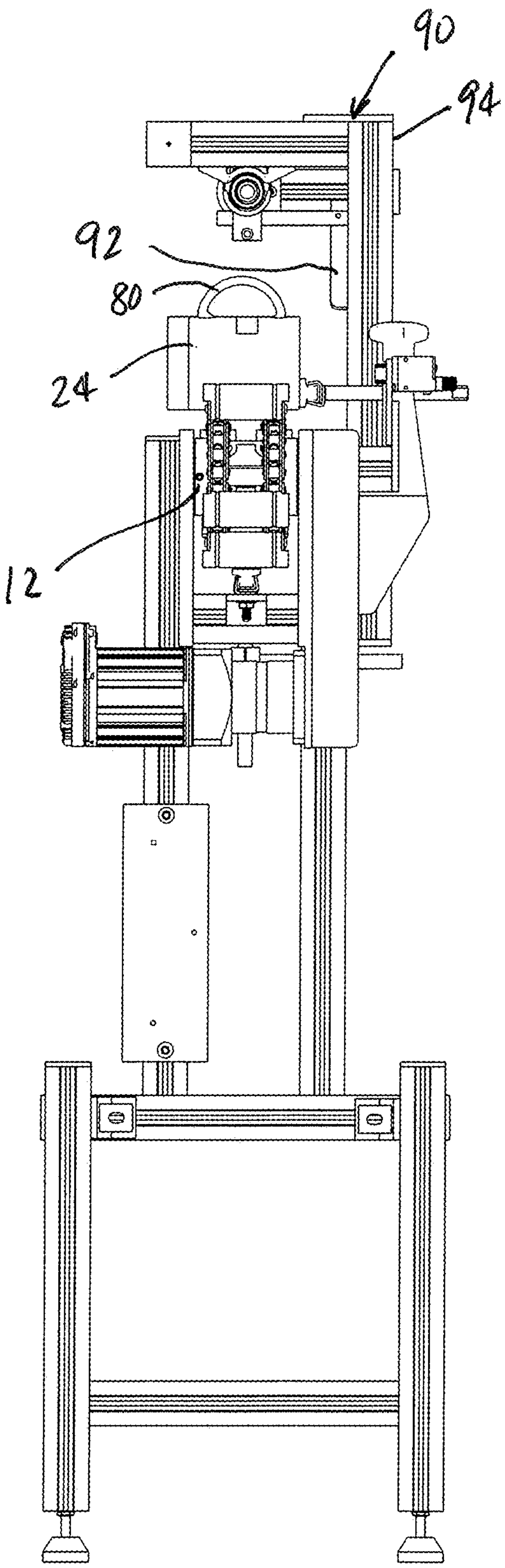
Figure 25:
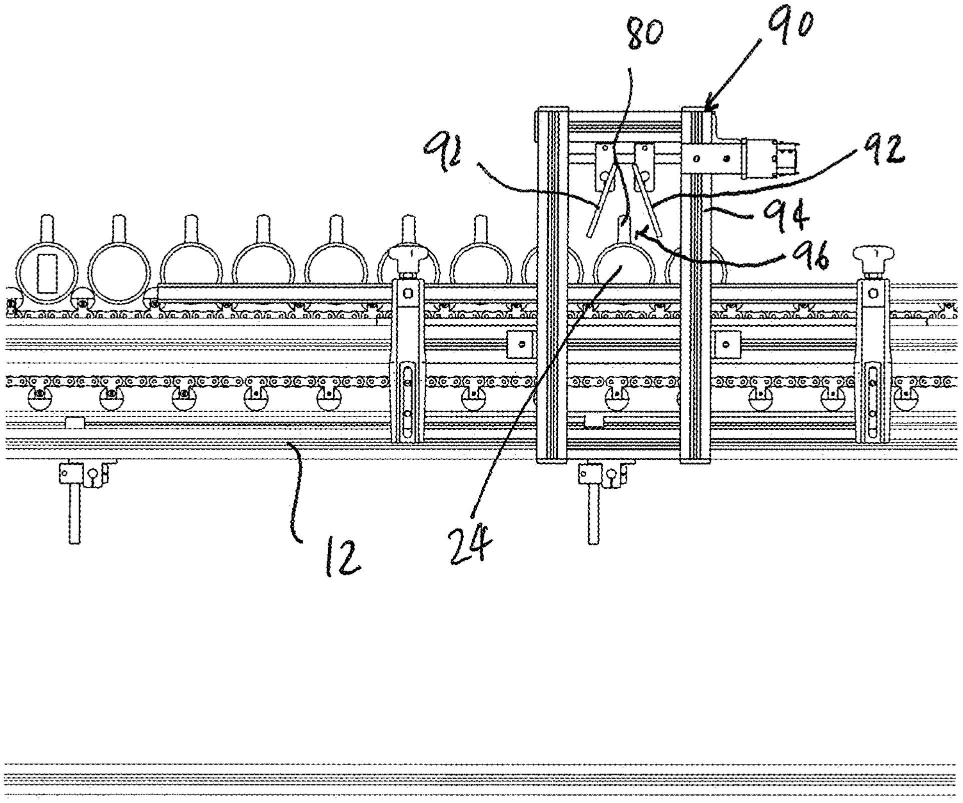

As shown in FIG. 1, a handle straightening fixture 90 may be provided on the conveyor upstream from the loading position 30. The fixture 90 may be used to align the handles 80 of the mugs 24 in an upward vertical position (i.e., a twelve o'clock alignment) in preparation for receipt in the guide 74 as described above. The fixture 90 includes two paddles 92 which are swivably attached to frame 94, preferably, to reversibly rotate across 90° between up and down positions. An actuator, such as a rotary air actuator, may be utilized to reversibly rotate the paddles 92 over the range of swiveling. FIGS. 22-23 show the paddles 92 in a down position, engaging the handle 80 of a mug 24, with FIGS. 24-25 showing the paddles 92 in an up position. The paddles 92 are tapered to collectively define a V-shaped profile with an open mouth 96. The paddles 92 are arranged to swivel to the down position with the open mouth 96 leading. This allows for receipt of the handle 80 over a range of misaligned positions. With further swiveling, the handle 80 is further received between the paddles 92 to where the paddles 92 are both in contact with the handles 80. The dual contact of the paddles 92 aligns the handle 80 in the desired upward vertical position. A side rail may be provided along the conveyor 12, opposite the frame 94, in alignment with the engaged mug 24 to prevent the mug 24 from being pushed off the conveyor 12 by the paddles 92 during rotation to the down position. After reaching the down position, the paddles 92 are caused to rearwardly swivel to the up position, to be clear of the mugs 24 in allowing the conveyor 12 to index to the next position. The fixture 90 may be used to align each of the mugs 24 in turn.

Figure 26:
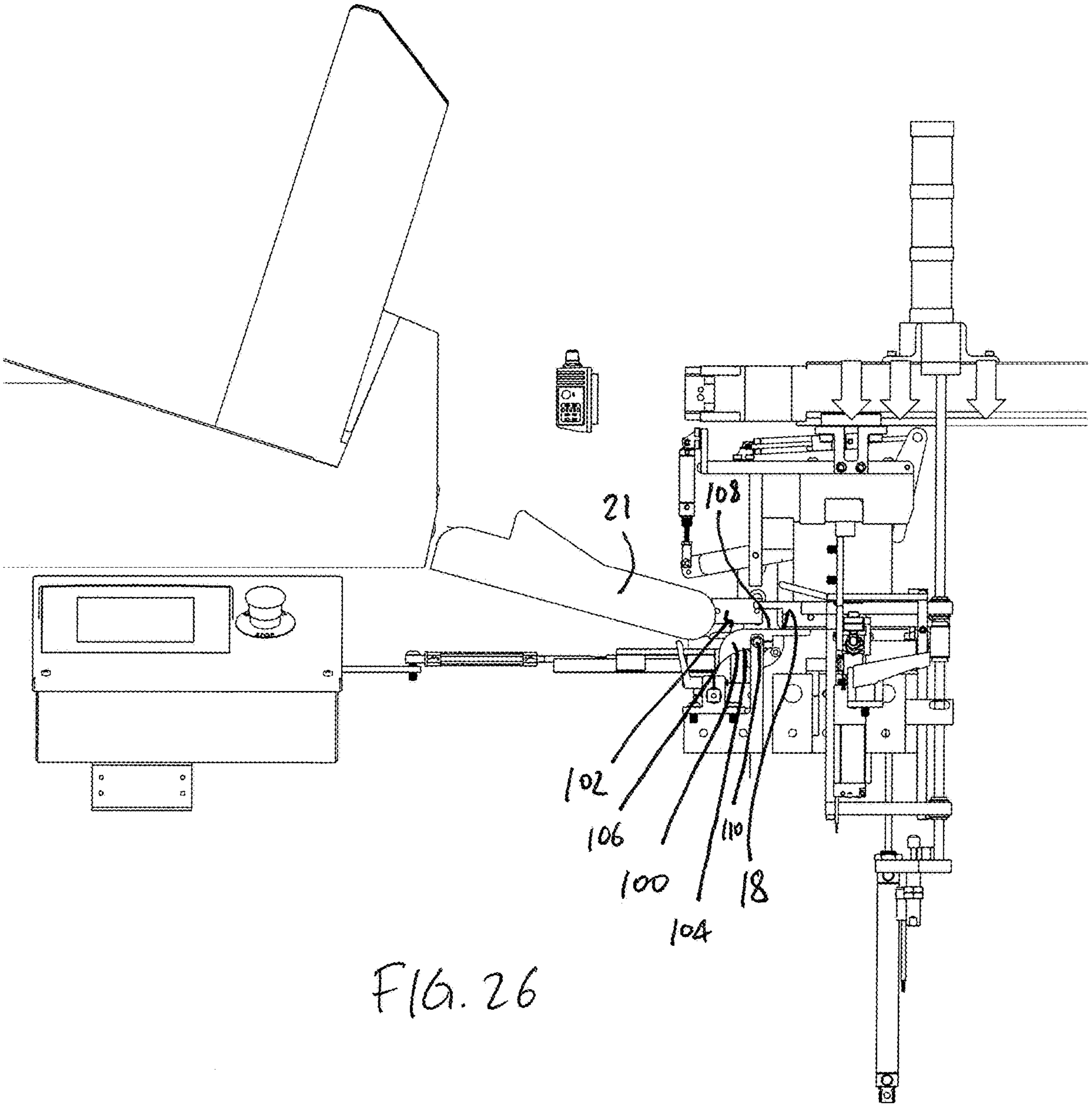
Figure 27:
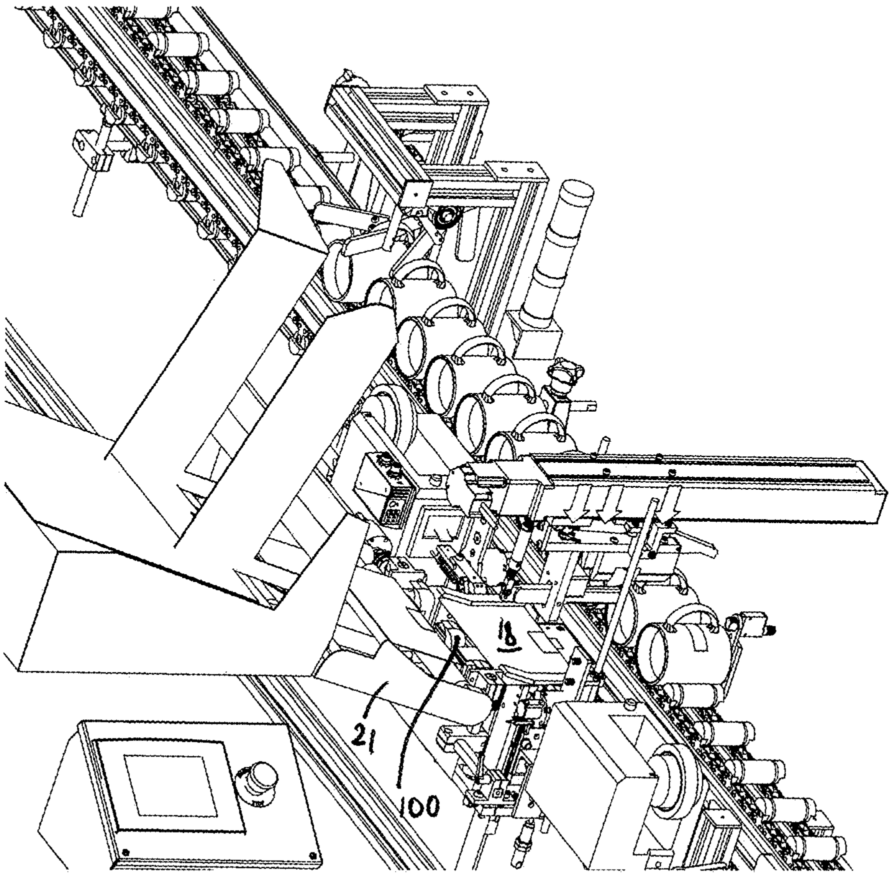
Figure 28:
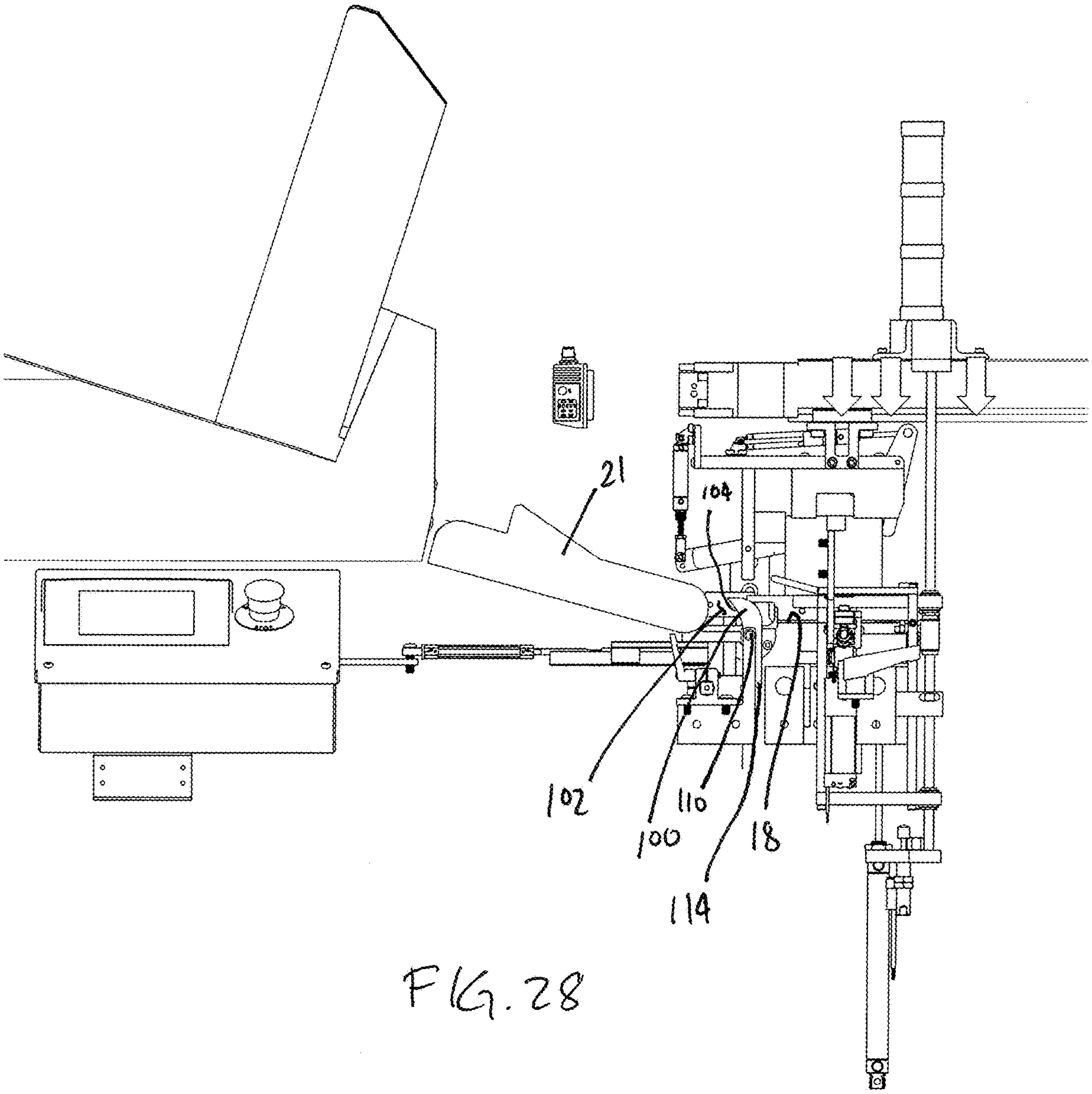
Figure 29:
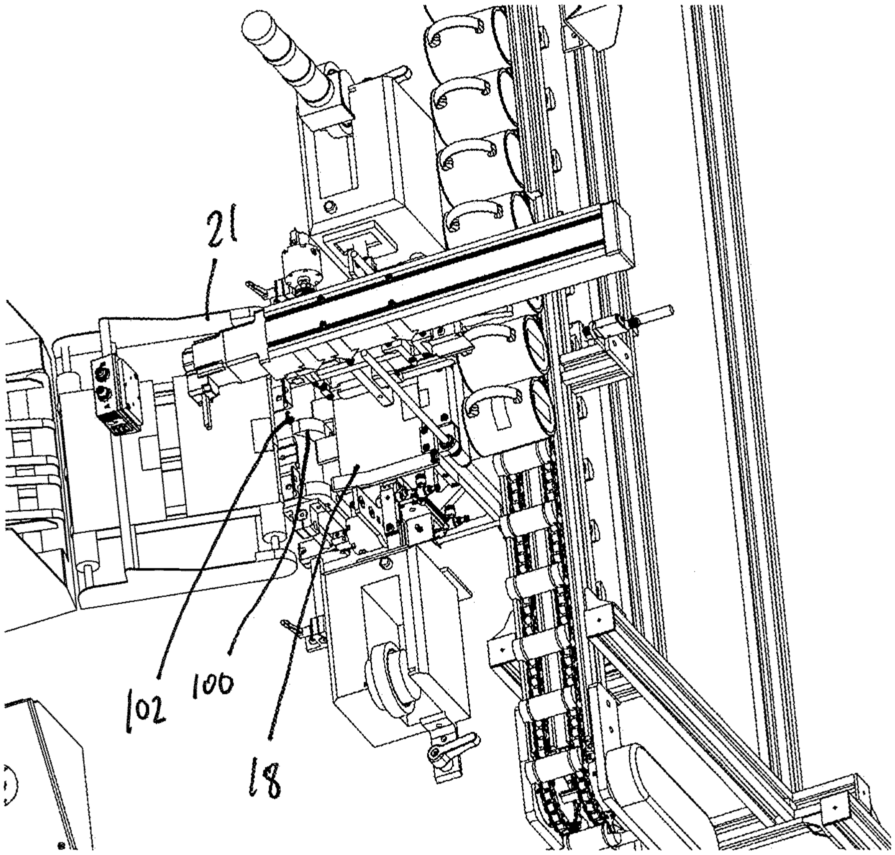

As an additional feature, an adjustable diverter 100 may be provided to allow for re-directing select sublimation transfers 16 away from the transfer platen 18. This allows for mid-stream removal of sublimation transfers during processing due to job cancellations, duplication, and so forth. The diverter 100 may be activated in response to readings by the optical reader 52. The diverter 100 may be aligned with a gap 102 defined between the feeder 21 and the transfer platen 18. In a first position, as shown in FIG. 26, the diverter 100 is in a down position, not obstructing the gap 102. This allows for sublimation transfers 16 to be conveyed from the feeder 21 to the transfer platen 18. As shown in FIGS. 27-29, the diverter 100 is in an up position, obstructing the gap 102. This inhibits conveyance of a sublimation transfer 16 from the feeder 21 to the transfer platen 18. The diverter 100 may be provided with a curved inner face 104 which terminates at an upper edge 106. With the diverter 100 in the up position, the curved inner face 104 is formed to guide a sublimation transfer 16 downwardly out of the feed path 42. The diverter 100 may have a generally planar rear face 108 which is upward facing, along, but not obstructing, the feed path 42, with the diverter 100 in the down position. The diverter 100 may be pivot mounted about pivot 110 to rotate between the up and down positions. A linear drive may be fixed to lower end 114 to cause rotation of the diverter 100. Alternatively, a rotary actuator, such as a rotary air actuator, may be utilized to rotate the diverter 100 between the up and down positions.

What is claimed is:

1. An automated system for fixing sublimation transfers to mugs in preparation for sublimation printing, the system comprising:

a conveyor for transporting the mugs;

an intake for intaking a supply of sublimation transfers;

a vertically adjustable transfer platen having an upwardly facing support surface;

a feeder for conveying, on an individual basis, the sublimation transfers from the intake to rest on the support surface;

a linear actuator for moving mugs, on an individual basis, from the conveyor to a target location above the support surface;

first and second tape applicators located along opposing sides of the transfer platen, the first and second tape applicators being each configured to apply a fixed length of heat resistant tape to a sublimation transfer resting on the support surface; and vertically adjustable first and second wrapping arms located along opposing sides of the transfer platen, each of the first and second wrapping arms having an inwardly directed engagement surface, wherein, with a sublimation transfer resting on the support surface, and a target mug in the target location, the transfer platen is caused to elevate to press a central portion of the sublimation transfer against the target mug, and the first and second wrapping arms are caused to elevate with the engagement surfaces thereof pressing against at least portions of lateral portions of the sublimation transfer, located on opposing sides of the central portion, to wrap the lateral portions of the sublimation transfer about the target mug and to press the heat resistant tape into adherence with the target mug to provide a prepared mug for sublimation printing.

2. The system of claim 1, wherein the transfer platen is located between the feeder and the conveyor.

3. The system of claim 1, wherein the linear actuator moves the prepared mug from the target location to the conveyor.

4. The system of claim 1, wherein the conveyor advances in fixed increments.

5. The system of claim 1, wherein the conveyor advances to a loading position in alignment with the linear actuator.

6. The system of claim 5, wherein the linear actuator includes an inverted U-shaped guide positioned to register with a handle of a mug located at the loading position on the conveyor.

7. The system of claim 6, wherein the handle is received into the guide with the linear actuator moving a mug from the loading position to the target location as the target mug, the guide being configured to limit rotational movement of the handle of the target mug in the target location.

8. The system of claim 6, wherein the guide includes spaced-apart side walls which define downward facing stop surfaces at free ends thereof, and, wherein the elevating of the transfer platen causes the target mug to be pressed against the stop surfaces.

9. The system of claim 8, wherein, with the target mug pressed against the stop surfaces, the side walls are positioned: i. to be adjacent to, and on opposing sides of, the handle of the target mug; and, ii. between the lateral portions of the sublimation transfer in the wrapped state.

10. The system of claim 5, wherein a stop block is positioned to limit axial movement of a mug being moved from the loading position to the target location by the linear actuator as the target mug.

11. The system of claim 5, further comprising a handle straightening fixture located along the conveyor, upstream from the loading position, wherein, the handle straightening fixture includes first and second paddles swivably attached to a frame, the first and second paddles being swivelable from a first position to a second position, wherein, with the first and second paddles being in the second position, a handle of a mug located at the loading position on the conveyor is located between the first and second paddles, and, wherein, with the first and second paddles being in the first position, no portion of the handle of the mug located at the loading position is located between the first and second paddles.

12. The system of claim 11, wherein the first and second paddles are disposed to define a V-shaped profile with an open mouth, the open mouth being situated to lead with the first and second paddles swiveling from the first position to the second position.

13. The system of claim 11, wherein the handle of the mug located at the loading position comes into contact with both of the first and second paddles with the first and second paddles swiveling to the second position.

14. The system of claim 11, further comprising a side rail, along the conveyor, opposite the frame.

15. The system of claim 1, further comprising a diverter adjustable between a blocking position, where the diverter extends through a gap between the feeder and the transfer platen to block the sublimation transfers from being conveyed from the feeder to the transfer platen, and a non-blocking position, where the diverter does not extend through the gap thereby allowing the sublimation transfers to be conveyed from the feeder to the transfer platen.

16. The system of claim 15, wherein the diverter includes a curved face which faces the feeder with the diverter in the blocking position, the curved face being configured to guide blocked sublimation transfers through the gap.

17. The system of claim 15, wherein the diverter is rotatable between the blocking position and the non-blocking position.

* * * * *